US012634807B2

(12) United States Patent
Fu et al.

(10) Patent No.: US 12,634,807 B2
(45) Date of Patent: May 19, 2026

(54) METHOD AND SYSTEM TO SUPPORT RESTRICTED PROXIMITY-BASED SERVICES (ProSE) DIRECT DISCOVERY BASED ON UE IDENTIFIER (UE ID)

(71) Applicant: Telefonaktiebolaget LM Ericsson (publ), Stockholm (SE)

(72) Inventors: Zhang Fu, Stockholm (SE); Shabnam Sultana, Montreal (CA); Juying Gan, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 344 days.

(21) Appl. No.: 18/274,600

(22) PCT Filed: Jan. 31, 2022

(86) PCT No.: PCT/EP2022/052237
§ 371 (c)(1),
(2) Date: Jul. 27, 2023

(87) PCT Pub. No.: WO2022/162228
PCT Pub. Date: Aug. 4, 2022

(65) Prior Publication Data
US 2024/0172097 A1 May 23, 2024

(30) Foreign Application Priority Data
Feb. 1, 2021 (WO) ................ PCT/CN2021/074665

(51) Int. Cl.
*H04W 48/14* (2009.01)
*H04W 8/00* (2009.01)
(52) U.S. Cl.
CPC ........... *H04W 48/14* (2013.01); *H04W 8/005* (2013.01)

(58) Field of Classification Search
CPC .............................. H04W 48/14; H04W 8/005
(Continued)

(56) References Cited

U.S. PATENT DOCUMENTS

2017/0201934 A1* 7/2017 Kim ...................... H04W 48/18
2019/0098692 A1* 3/2019 Atarius ............... H04L 65/1069
(Continued)

OTHER PUBLICATIONS

3GPP, "3rd Generation Partnership Project; Technical Specification Group Services and System Aspects; Procedures for the 5G System (5GS); Stage 2, Release 16", 3GPP TS 23.502, V16.7.1, Technical Specification, Jan. 2021, 603 pages.
(Continued)

*Primary Examiner* — Hirdepal Singh
(74) *Attorney, Agent, or Firm* — NICHOLSON DE VOS WEBSTER & ELLIOTT LLP

(57) ABSTRACT
Methods, systems, and Instructions are disclosed to support restricted Proximity-based Services (ProSe) direct discovery in a wireless network. In one embodiment, a method is performed by a first network function (NF), where a terminal device communicates with another terminal device based on the restricted ProSe direct discovery. The wireless network is to assign one ProSe Discovery user equipment (UE) identifier (PDUID) to the terminal device to identify the terminal device in the restricted ProSe direct discovery. The method comprises receiving a request message including a UE identifier (UE ID), where the UE ID uniquely identifies the UE in the wireless network; generating a ProSe Discovery user equipment (UE) identifier (PDUID) for the UE ID based on the UE ID; and transmitting a PDUID information message to a second NF, where the PDUID information message comprises the PDUID and a validity timer.

18 Claims, 17 Drawing Sheets

PC3

DPF

Direct Discovery Name Mgmt Function

EPC-level Discovery Function

HPLMN ProSe Function

UE

Legend 152
DPF (Direct Provisioning Function)
EPC (Evolved Packet Core)
HPLMN (Home Public Land Mobile Network)
ProSe: Proximity Services

(58) Field of Classification Search

USPC ........................................................ 455/434

See application file for complete search history.

(56) References Cited

U.S. PATENT DOCUMENTS

2019/0394631 A1 * 12/2019 Stojanovski .......... H04W 8/005
2020/0196375 A1 * 6/2020 Ryu ...................... H04W 76/34
2022/0330138 A1 * 10/2022 Shan ..................... H04W 48/16
2023/0188997 A1 * 6/2023 Li ..................... H04W 12/0431
713/171

OTHER PUBLICATIONS

3GPP, "3rd Generation Partnership Project; Technical Specification Group Services and System Aspects; Proximity based Services (ProSe) in the 5G System (5GS), Release 17", 3GPP TS 23.304, V17.1.1, Technical Specification, Jan. 2022, 99 pages.

3GPP, "3rd Generation Partnership Project; Technical Specification Group Services and System Aspects; Proximity-based services (ProSe); Stage 2, Release 16", 3GPP TS 23.303, V16.0.0, Technical Specification, Jul. 2020, 130 pages.

3GPP, "3rd Generation Partnership Project; Technical Specification Group Services and System Aspects; Study on system enhancement for Proximity based Services (ProSe) in the 5G System (5GS), Release 17", 3GPP TR 23.752, V1.0.0, Technical Report, Nov. 2020, 181 pages.

3GPP, "3rd Generation Partnership Project; Technical Specification Group Services and System Aspects; System architecture for the 5G System (5GS); Stage 2, Release 16", 3GPP TS 23.501, V16.7.0, Technical Specification, Dec. 2020, 450 pages.

3GPP, "Presentation of TR 23.752: 'Study on system enhancement for Proximity based Services (ProSe) in the 5G System (5GS)' to TSG SA for information", TSG SA Meeting #SP-90E, SP-200962, Dec. 8-14, 2020, 2 pages.

Huawei et al., "KI#1 Sol#18 Update on Control Plane based 5G DDNMF Deployment", 3GPP TSG-WG SA2 Meeting #142E e-meeting, S2-2008832, Nov. 16-20, 2020, 7 pages.

International Search Report and Written Opinion, PCT App. No. PCT/EP2022/052237, Jun. 1, 2022, 23 pages.

Office Action, EP App. No. 22706256.9, Nov. 7, 2025, 14 pages.

* cited by examiner

Legend 152
DPF (Direct Provisioning Function)
EPC (Evolved Packet Core)
HPLMN (Home Public Land Mobile Network)
ProSe: Proximity Services Legend 252

HSS (Home Subscriber Server)
SLP (SUPL Local Platform)
SUPL (Secure User Plane Location)
VPLMN (Visited PLM)

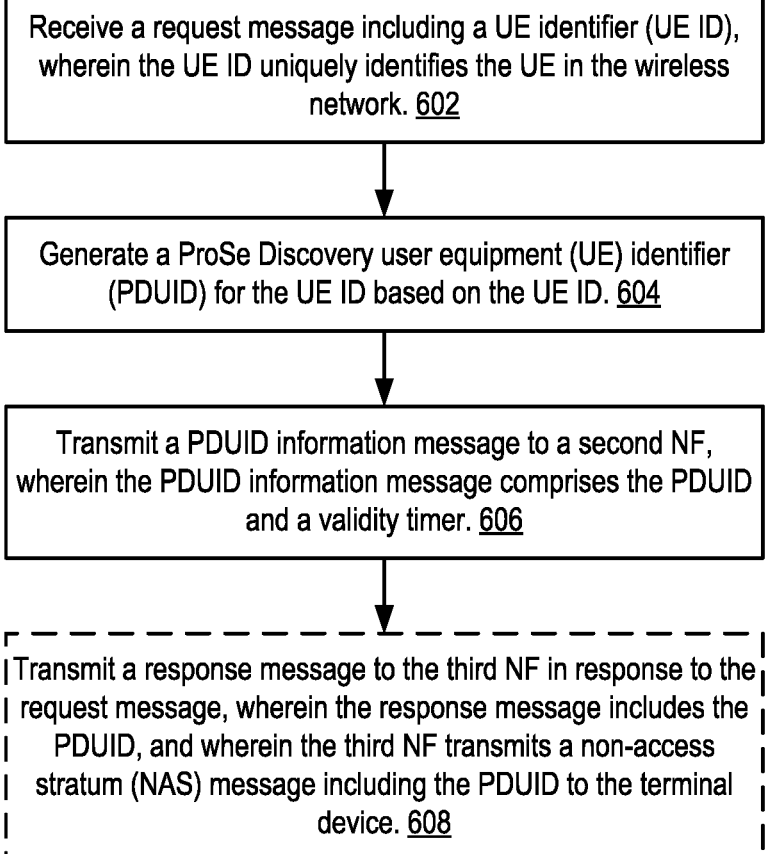

Receive a request message including a UE identifier (UE ID), wherein the UE ID uniquely identifies the UE in the wireless network. 602

Generate a ProSe Discovery user equipment (UE) identifier (PDUID) for the UE ID based on the UE ID. 604

Transmit a PDUID information message to a second NF, wherein the PDUID information message comprises the PDUID and a validity timer. 606

Transmit a response message to the third NF in response to the request message, wherein the response message includes the PDUID, and wherein the third NF transmits a non-access stratum (NAS) message including the PDUID to the terminal device. 608

FIG. 6

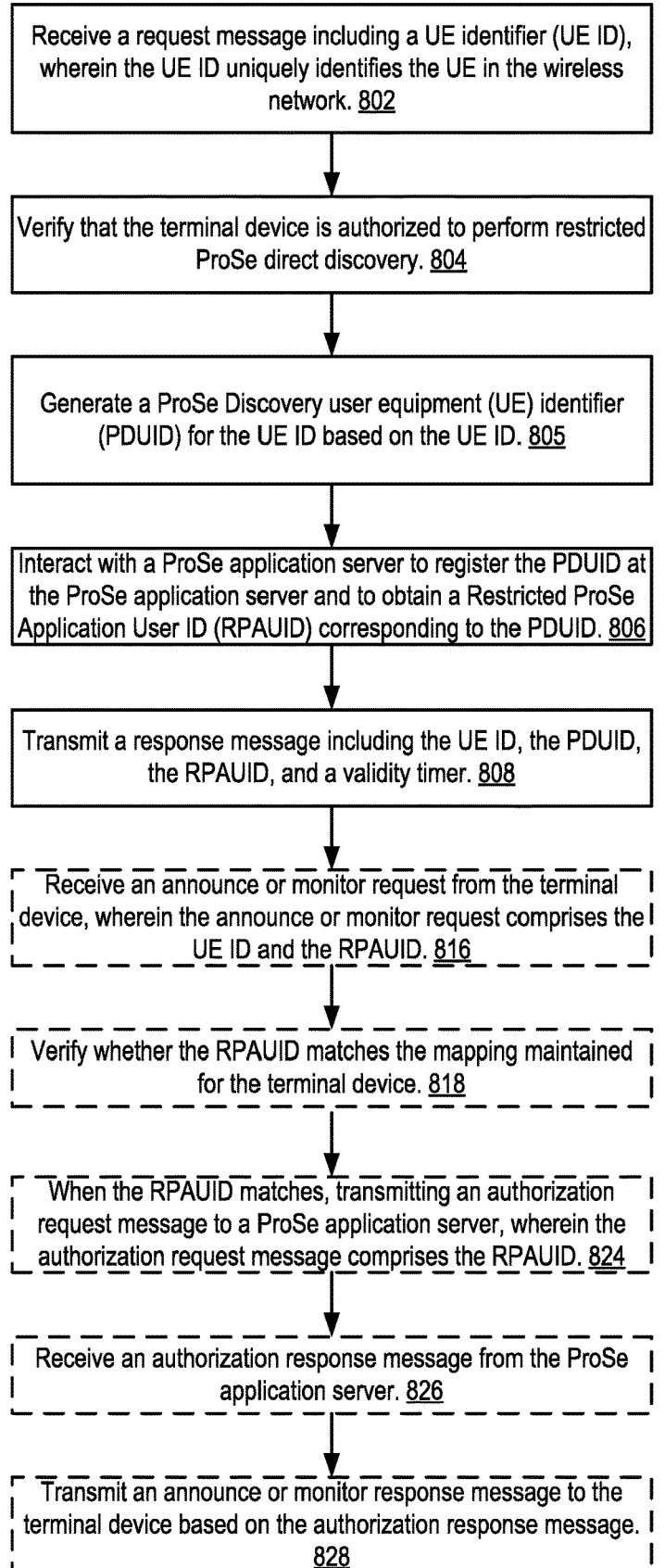

Receive a request message including a UE identifier (UE ID), wherein the UE ID uniquely identifies the UE in the wireless network. 802

Verify that the terminal device is authorized to perform restricted ProSe direct discovery. 804

Generate a ProSe Discovery user equipment (UE) identifier (PDUID) for the UE ID based on the UE ID. 805

Interact with a ProSe application server to register the PDUID at the ProSe application server and to obtain a Restricted ProSe Application User ID (RPAUID) corresponding to the PDUID. 806

Transmit a response message including the UE ID, the PDUID, the RPAUID, and a validity timer. 808

Receive an announce or monitor request from the terminal device, wherein the announce or monitor request comprises the UE ID and the RPAUID. 816

Verify whether the RPAUID matches the mapping maintained for the terminal device. 818

When the RPAUID matches, transmitting an authorization request message to a ProSe application server, wherein the authorization request message comprises the RPAUID. 824

Receive an authorization response message from the ProSe application server. 826

Transmit an announce or monitor response message to the terminal device based on the authorization response message. 828

FIG. 8

BEGIN

Host computer provides user data 1610

Host computer initiates transmission carrying the user data to the UE 1620

UE receives the user data 1630

END

BEGIN

Base station receives user data from UE 1810

Base station initiates transmission of user data to the host computer 1820

Host computer receives the user data 1830

END

METHOD AND SYSTEM TO SUPPORT RESTRICTED PROXIMITY-BASED SERVICES (ProSe) DIRECT DISCOVERY BASED ON UE IDENTIFIER (UE ID)

CROSS-REFERENCE TO RELATED APPLICATIONS

This application is a National stage of International Application No. PCT/EP2022/052237, filed Jan. 31, 2022, which claims priority to International Application No. PCT/CN2021/074665, filed Feb. 1, 2021, which are hereby incorporated by reference.

TECHNICAL FIELD

Embodiments of the invention relate to the field of wireless networking; and more specifically, to support restricted Proximity-based Services (ProSe) direct discovery in a wireless network.

BACKGROUND

Proximity-based Services (ProSe) is a D2D (Device-to-Device) technology that allows wireless devices (e.g., UEs) to detect each other and to communicate directly. In comparison to existing D2D and proximity networking technologies, ProSe offers several distinct benefits including better scalability, manageability, privacy, security, and battery-efficiency.

A ProSe function is the logical function that is used for network related actions required for ProSe. The ProSe function plays different roles for each of the features of ProSe. In some deployments, there is only one logical ProSe function in each public land mobile network (PLMN) that supports Proximity Services, while in other deployments, multiple ProSe functions are deployed in the same PLMN (e.g., for load reasons).

While ProSe has been implemented in Fourth Generation (4G) Long-Term Evolution (LTE) Systems as the ProSe function(s), how to implement ProSe in the Fifth Generation (5G) New Radio (NR) Systems or other future cellular networks is still under discussion. For example, the operations to implement ProSe in a 4G/LTE system need to be mapped to the operations of functional blocks (e.g., network functions (NFs)) in a 5G/NR system architecture. Standard bodies such as the third Generation Partnership Project (3GPP) have not specified how such mapping of operations and functional blocks would work. And operators of wireless networks prefer to implement ProSe in a 5G/NR system with efficiency and leveraging known operations and logical functions.

SUMMARY

Embodiments of the application offer efficient ways to support restricted Proximity-based Services (ProSe) direct discovery in a wireless network. In one embodiment, a method is performed by a first network function (NF) to support restricted Proximity-based Services (ProSe) direct discovery in a wireless network, where a terminal device communicates with another terminal device based on the restricted ProSe direct discovery. The wireless network is to assign one ProSe Discovery user equipment (UE) identifier (PDUID) to the terminal device to identify the terminal device in the restricted ProSe direct discovery. The method comprises receiving a request message including a UE identifier (UE ID), where the UE ID uniquely identifies the UE in the wireless network; generating a ProSe Discovery user equipment (UE) identifier (PDUID) for the UE ID based on the UE ID; and transmitting a PDUID information message to a second NF, wherein the PDUID information message comprises the PDUID and a validity timer.

In another embodiment, a method is performed by the second NF, the method comprises receiving an announce or monitor request from the terminal device, where the announce or monitor request comprises the UE ID and a Restricted ProSe Application User ID (RPAUID). The method continues with verifying that the terminal device is authorized to perform the restricted ProSe direct discovery; receiving a PDUID information message comprising a PDUID corresponding to the UE ID from the first NF; and transmitting (430) a response to the announce or monitor request from the terminal device, indicating whether the announce or monitor request is accepted.

In another embodiment, a method is performed by a NF to support restricted Proximity-based Services (ProSe) direct discovery in a wireless network, wherein a terminal device communicates with another terminal device based on the restricted ProSe direct discovery, and wherein the wireless network is to assign one ProSe Discovery user equipment (UE) identifier (PDUID) to the terminal device to identify the terminal device in the restricted ProSe direct discovery. The method comprises receiving a request message including a UE identifier (UE ID), wherein the UE ID uniquely identifies the UE in the wireless network; verifying that the terminal device is authorized to perform the restricted ProSe direct discovery; generating a ProSe Discovery user equipment (UE) identifier (PDUID) for the UE ID based on the UE ID; interacting with a ProSe application server to register the PDUID at the ProSe application server and to obtain a Restricted ProSe Application User ID (RPAUID) corresponding to the PDUID; and transmitting, a response message including the UE ID, the PDUID, the RPAUID, and a validity timer.

In one embodiment, a network node is to implement the first network function (NF) to perform the methods for the first NF discussed herein. In another embodiment, a network node is to implement the second NF to perform the methods for the second NF discussed herein. In yet another embodiment, a network node is to implement the NF to perform the methods for the NF discussed herein.

In one embodiment, a non-transitory machine-readable storage medium is disclosed that provides instructions that, when executed by a processor, cause a network node to perform methods for the first NF discussed herein. In another embodiment, a non-transitory machine-readable storage medium is disclosed that provides instructions that, when executed by a processor, cause a network node to perform methods for the second NF discussed herein. In yet another embodiment, a non-transitory machine-readable storage medium is disclosed that provides instructions that, when executed by a processor, cause a network node to perform methods for the NF discussed herein.

Through embodiments of the application, a 5G/6G or proprietary system may implement ProSe and support restricted Proximity-based Services (ProSe) direct discovery in the 5G/6G or proprietary system, and that enables a smooth transition from the legacy ProSe function in a 4G/LTE system.

BRIEF DESCRIPTION OF THE DRAWINGS

The invention may best be understood by referring to the following description and accompanying drawings that are used to illustrate embodiments of the invention. In the drawings:

FIG. 6 is a flow diagram to show operations at a first Network Function (NF) to support restricted Proximity-based Services (ProSe) direct discovery per the first set of embodiments.

FIG. 8 is a flow diagram to show operations at a Network Function (NF) to support restricted Proximity-based Services (ProSe) direct discovery per the second set of embodiments.

DETAILED DESCRIPTION

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description. Note while user equipment (UE) is used as an example of a wireless device, embodiments of the application may be applied to other wireless devices. Additionally, while the fifth generation (5G) systems are used as examples of broadband cellular networks, embodiments of the application may be applied to other standard based cellular networks (e.g., the sixth generation (6G) systems) or proprietary networks.

References in the specification to "one embodiment," "an embodiment," "an example embodiment," and so forth, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The description and claims may use the terms "coupled" and "connected," along with their derivatives. These terms are not intended as synonyms for each other. "Coupled" is used to indicate that two or more elements, which may or may not be in direct physical or electrical contact with each other, co-operate or interact with each other. "Connected" is used to indicate the establishment of wireless or wireline communication between two or more elements that are coupled with each other. A "set," as used herein, refers to any positive whole number of items including one item.

ProSe in 4G/LTE Systems

Figure 1:
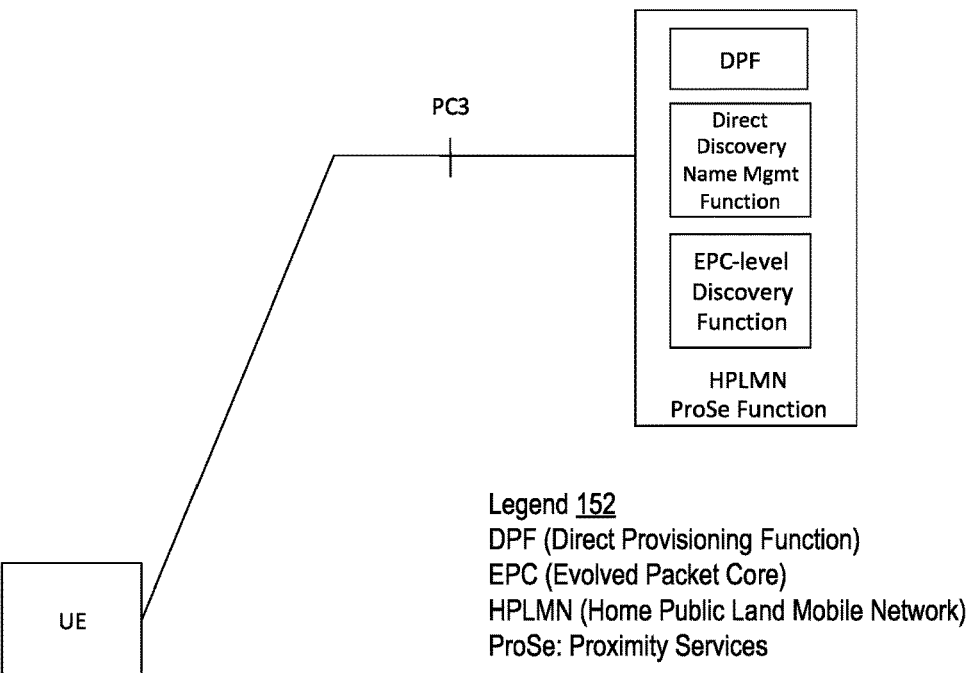
FIG. 1 shows functional components within a ProSe function to implement ProSe from the network side per 4G implementation.

The ProSe function comprises three main sub-functions that perform different roles depending on the ProSe feature as shown in FIG. 1, including (1) Direct Provisioning Function (DPF), (2) Direct Discovery Name Management Function (DDNMF), and (3) Evolved Packet Core (EPC)—level Discovery ProSe Function per 4G/LTE implementation.

(1) Direct Provisioning Function (DPF) is used to provision a UE with necessary parameters in order to use ProSe Direct Discovery and ProSe Direct Communication. It is used to provision the UEs with PLMN specific parameters that allow the UE to use ProSe in this specific PLMN. For direct communication used for Public Safety, DPF is also used to provision the UE with parameters that are needed when the UE is not served by Evolved Universal Terrestrial Radio Access Network (E-UTRAN). For restricted ProSe Direct Discovery, the DPF also generates and maintains the ProSe Discovery UE ID (PDUID) in 4G systems. Note PDUID is a temporary identifier assigned by the ProSe Function in the HPLMN to the UE for the restricted direct discovery service. It includes the PLMN ID and a temporary identifier that uniquely identifies the UE in the Home PLMN (HPLMN).

Figure 2:
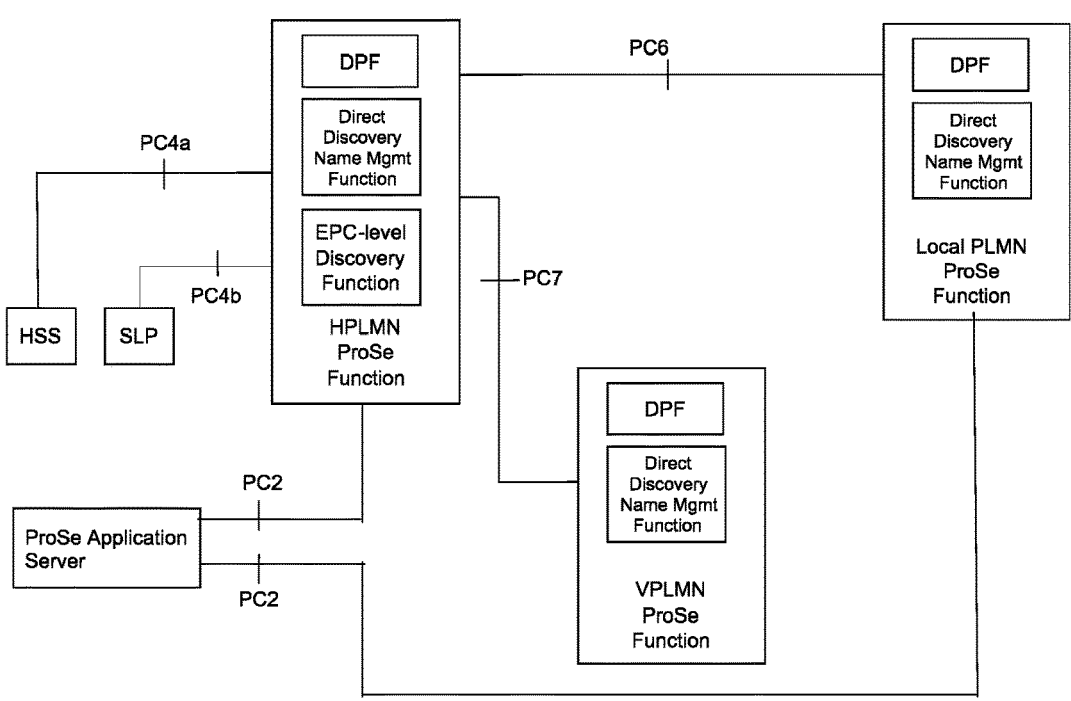
FIG. 2 shows ProSe Function interfaces to other network elements and PLMN per 4G implementation.

(2) Direct Discovery Name Management Function (DDNMF) is used for open ProSe Direct Discovery to allocate and process the mapping of ProSe Application IDs and ProSe Application Codes used in ProSe Direct Discovery. It uses ProSe related subscriber data stored in Home Subscriber Server (HSS) for authorization for each discovery request. It also provides the UE with the necessary security material in order to protect discovery messages transmitted over the air. In restricted ProSe Direct Discovery, it also interacts with the application server via PC2 reference points for the authorization of the discovery requests. FIG. 2 shows ProSe Function interfaces to other network elements and PLMN per 4G implementation. Note a restricted ProSe Direct Discovery takes place with explicit permission from the UE being discovered (in contrast to an open ProSe Direct Discovery, where no explicit permission is needed from the UE being discovered).

(3) EPC-level Discovery ProSe Function has a reference point towards the application server (PC2), towards other ProSe Functions (PC6), towards the HSS (PC4a) and the UE (PC3). The functionality includes the following:

Storage of ProSe-related subscriber data and/or retrieval of ProSe-related subscriber data from the HSS;

Authorization and configuration of the UE for EPC-level ProSe Discovery and EPC-assisted WLAN direct discovery and communication over PC3;

Storage of a list of applications that are authorized to use EPC-level ProSe Discovery and EPC-assisted WLAN direct discovery and communication;

Acting as location services client (SLP agent) to enable EPC-level ProSe Discovery;

Providing the UE with information to assist WLAN direct discovery and communications;

Handling of EPC ProSe User IDs and Application Layer User IDs;

Exchange of signalling with third party application servers over PC2 reference point for application registration and identifier mapping;

Exchange of signalling with ProSe Functions in other PLMNs over PC6 reference points for sending proximity requests, proximity alerts, and location reporting; and Optional support for functionality for requesting UE location via the HSS.

The ProSe Function in 4G/LTE system may support "on demand" announcing requested by UE based on operator's policy, in case of ProSe restricted discovery model A. Note that model A ("I am here") defines two roles for the ProSe-enabled UEs that are participating in ProSe Direct Discovery: (1) Announcing UE: The UE announces certain information that could be used by UEs in proximity that have permission to discover, and (2) Monitoring UE: The UE that monitors certain information of interest in proximity of announcing UEs. In this model, the announcing UE broadcasts discovery messages at pre-defined discovery intervals and the monitoring UEs that are interested in these messages read them and process them. Both open and restricted discovery types are supported by Model A.

Model B ("who is there?"/"are you there?) defines two roles for the ProSe-enabled UEs that are participating in ProSe Direct Discovery when restricted discovery type is used: (1) Discover UE: The UE transmits a request containing certain information about what it is interested to discover, and (2) Discoveree UE: The UE that receives the request message can respond with some information related to the discoverer's request. Only restricted discovery type is supported by Model B.

The ProSe Function provides the necessary charging and security functionality for usage of ProSe (both ProSe via the EPC and for ProSe Direct Discovery, ProSe Direct Communication, and WLAN direct discovery and communication). Note the ProSe Function in HPLMN can be always reached if Home Routed configuration is applied for Packet data network (PDN) connection (e.g., PDN gateway (GW)

is located in the HPLMN), when such function is supported by the HPLMN. In case of Local Breakout (e.g., PDN GW is located in the Visited PLMN (VPLMN)), a ProSe Proxy Function can be deployed by the VPLMN to support UE to Home ProSe Function communication, if inter-PLMN signalling is required. Whether a PDN connection is provided by Local Breakout or Home Routed is determined by the HSS configuration described in standard. UE is not aware of this and as such will not know which Access Point Name (APN) can be used for communication with ProSe Function unless specific APN information is configured in the UE indicating that this APN provides signalling connectivity between the UE and the Home ProSe Function.

ProSe Application Server

A ProSe application server, as shown in FIG. 2, supports the following capability:

Storage of EPC ProSe User IDs: ProSe Function IDs, ProSe Discovery UE ID (PDUID), metadata;

Mapping of Application Layer User IDs and EPC ProSe User IDs;

Mapping of Restricted ProSe Application User ID (RPAUID) and PDUID for restricted ProSe Direct Discovery;

Maintaining permission information for the restricted ProSe Direct Discovery using RPAUIDs;

Allocation of the ProSe Restricted Code Suffix pool, if restricted Direct Discovery with application-controlled extension is used; and Allocation of the mask(s) for ProSe Restricted Code Suffix, if restricted Direct Discovery with application-controlled extension is used.

Restricted ProSe Application User ID (RPAUID)

Note that RPAUID is an identifier associated with the Application Layer User ID in the ProSe application server in order to hide/protect the application level user identity from the 3GPP layer. It unambiguously identifies the user within a given application. The 3GPP layer includes a physical layer ("PHY"), a media access control layer ("MAC"), a radio link control layer ("RLC"), a packet data convergence protocol (PDCP) layer, an Internet Protocol (IP) and Allocation Retention Priority (ARP) layer, while the application layer is above the 3GPP layers.

Usage of PDUID Among UE, ProSe Function, and ProSe Application Server

The ProSe enabled UE retrieves PDUID from the ProSe Function. A UE provides its PDUID to the ProSe application server and gets its RPAUID from the server. When the ProSe enabled UE wants to conduct restricted ProSe discovery, it sends either an Announce request or a Monitor request to its ProSe Function to get the corresponding restricted discovery code (details are explained in standards such as 3GPP). In the Announce/Monitor request, the UE includes its UE ID (e.g., international mobile subscriber identity (IMSI)) and its RPAUID. If the ProSe Function needs authorization result from the application server, it sends the Authorization request to the ProSe application server with the RPAUID (but without the UE ID and PDUID). The ProSe application server responds with the UE's PDUID (and the RPAUID in some implementation) to the ProSe Function if the authorization is OK. The ProSe Function checks if the PDUID is the one mapped to the UE ID (e.g., IMSI). If the PDUID received from the application server is the one mapping to the UE ID based on the mapping in the ProSe function, the ProSe Function grants authorization of ProSe to the UE and provides the corresponding restricted discovery code.

Note that the corresponding restricted discovery code includes one or more of the following:

(1) ProSe Application ID: The ProSe Application ID is an identity used for open ProSe Direct Discovery, identifying application related information for the ProSe-enabled UE. Each ProSe Application ID could be globally unique.

(2) ProSe Application Code: The ProSe Application Code is associated with the ProSe Application ID and used in the open ProSe Direct Discovery procedures.

(3) ProSe Application Mask: The ProSe Application Mask is provided by the ProSe Function in order to allow the monitoring UE to perform partial matching of ProSe Application Codes/ProSe Restricted Codes on the PC5 interface.

(4) ProSe Query Code: The ProSe Query Code is a ProSe Application Code or ProSe Restricted Code allocated by the ProSe Function in the HPLMN to the Discoverer UE for Model B discovery. The ProSe Query Code is sent by the Discoverer UE over the air.

(5) ProSe Response Code: The ProSe Response Code is a ProSe Application Code or ProSe Restricted Code allocated by the ProSe Function in the HPLMN to the Discoveree UE for Model B discovery. The ProSe Response Code is sent by the Discoveree UE over the air upon receiving a ProSe Query Code matching the Discovery Query Filter.

(6) ProSe Restricted Code: The ProSe Restricted Code is allocated by the ProSe Function in the HPLMN for Restricted Direct Discovery and is associated with one or more Restricted ProSe App User IDs based on the policy of the ProSe Function that allocates it. The ProSe Restricted Code is sent by the announcing UE over the air.

(7) ProSe Restricted Code Prefix: For restricted Direct Discovery with application-controlled extension, a part of the ProSe Restricted Code that is assigned by the ProSe Function in the HPLMN.

(8) ProSe Restricted Code Suffix: For restricted Direct Discovery with application-controlled extension, a part of the ProSe Restricted Code that is under the control of the ProSe application server. The ProSe Restricted Code Suffix represents application specific information pertaining to the application that is indicated in the restricted ProSe App User ID.

Figure 3:
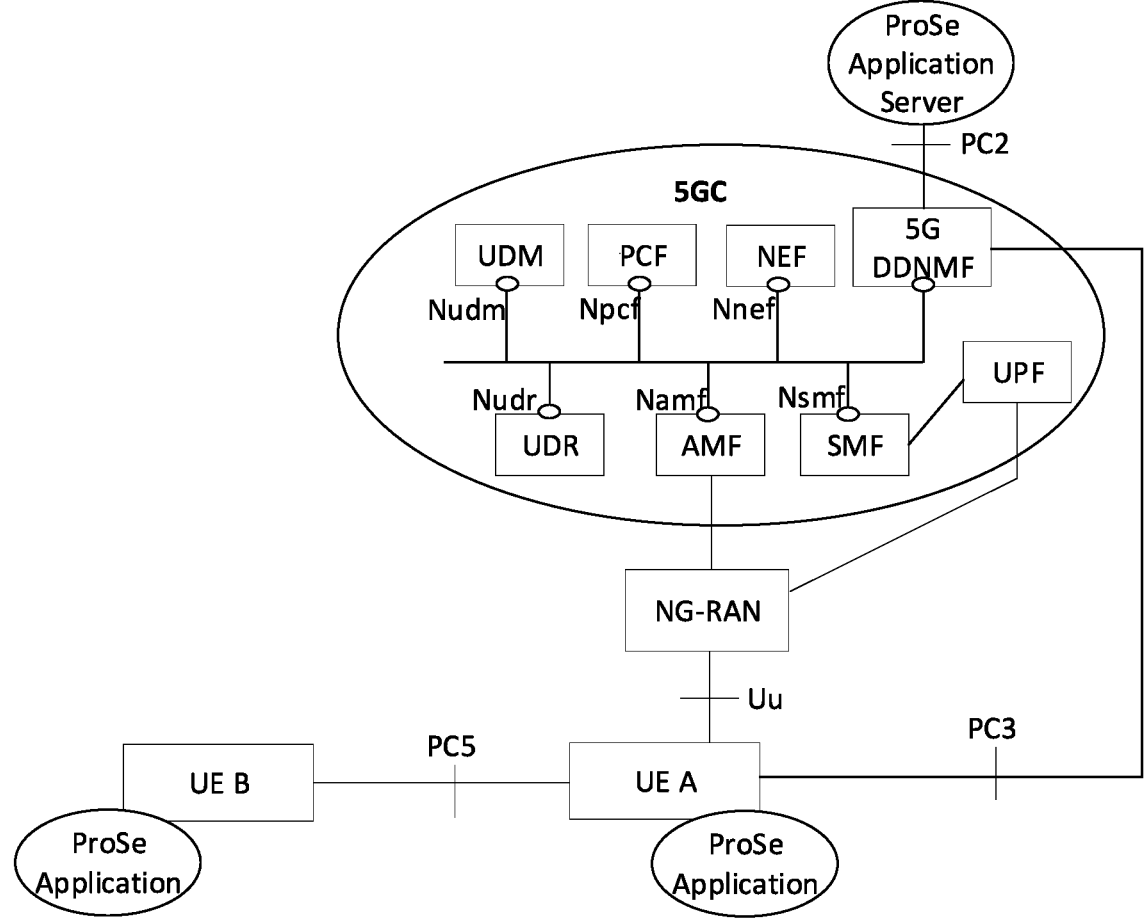
FIG. 3 shows a 5G System Architecture for ProSe Support.

ProSe in 5G Systems 5G systems (5GS) may implement an architecture option named "User Plane Based Architecture" to support ProSe. FIG. 3 shows a 5G System Architecture for ProSe Support. The architecture proposes to adopt necessary function of ProSe Function as defined in earlier standards into 5G system architecture, without a specific ProSe Function as in 4G/LTE systems (as shown in FIGS. 1 and 2). In earlier standards, Direct Discovery Name Management Function (DDNMF) and Direct Provisioning Function (DPF) of ProSe Function are necessary to support ProSe (both DDNMF and DPF are shown in FIGS. 1 and 2 and discussed herein as sub-functions of the ProSe Function). DPF may be used to provision the UE with necessary parameters in order to use 5G ProSe Direct Discovery and 5G ProSe Direct Communication, and DPF can be replaced by another network function (NF), a policy control function (PCF). DDNMF, as another NF (shown as 5G DDNMF in FIG. 3), may be used to provide the following procedures over PC3 interface:

Discovery Request/Response Procedure: to provide IDs and filter for direct discovery.

Match Report Procedure: to check direct discovery and provide mapping information for direct discovery.

Announcing Alert Procedure: Support "On-demand" ProSe Direct Discovery in case of ProSe restricted discovery model A.

Discovery Update Procedure: to update/revoke previously allocated IDs, filters.

A 5G system supports Service-Based Architecture, and DDNMF can be a network function (NF) that not only interacts with 5G NFs (e.g., to consume Nudm service operation where Nudm is a user data management (UDM) service-based interface) but also connects with a UE via user plane connectivity for support procedures over PC3 interface as shown in FIG. 3. Note that 5G DDNMF may be managed by mobile network operator (MNO), and 5G DDNMF may be able to consume service operation from other NFs in 5GC (5G Core) (e.g., Nudm or Npcf, (an interface to PCF)).

PC3 interface, as shown in FIG. 3, supports Discovery Request/Response, Match Report Procedure, Announcing Alert Procedure, and Discovery Update Procedure as following baseline features defined in standards such as 3GPP. Which Network Slice Selection Assistance Information (NSSAI) or Data Network Name (DNN) to be used for user plane connectivity for PC3 interface is up to MNO's configuration (e.g., it can be controlled by UE route selection policy (URSP) or local configuration in the UE).

While 5G DDNMF in a 5G system takes the responsibility from ProSe function (implemented in earlier systems such as 4G/LTE ones) for management of ProSe Discovery Code, it does not currently generate or maintain the mapping between PDUID and RPAUID. Thus, when the ProSe application server sends back a corresponding PDUID of a UE in response to an authorization request with a RPAUID from the 5G DDNMF, 5G DDNMF cannot verify if the PDUID belongs to the UE with the maintained mapping between PDUID and RPAUID. Embodiments of the present application address the problem and allow a 5G/6G or proprietary system to implement ProSe.

A First Set of Embodiments

In the first set of embodiments, a PCF in a system manages the PDUID. When the PCF generates or renews a PDUID for a UE, it sends the information to a DDNMF in the system. Alternatively/additionally, when the DDNMF receives a Announce/Monitor Request from a UE, it sends a request to the PCF to fetch the PDUID for the UE. The PCF replaces DPF in FIGS. 1 and 2 in this set of embodiments.

The PCF provides mapping between a UE ID (e.g., a subscription permanent identifier (SUPI) or subscription concealed identifier (SUCI)) and a PDUID to the DDNMF during the UE registration procedure. For PCF based Service Authorization and Provisioning to the UE, the registration procedures are defined in standards such as 3GPP. Note that the UE ID is not limited to SUPI or SUCI, other subscriber identifiers of the UE may be used in some embodiments.

In one embodiment, the Access and Mobility Management Function (AMF) gets the PDUID of the UE from the PCF via a service such as Npcf_UEPolicyControl_Create. UE Policy Association Establishment procedure is defined in standards such as 3GPP. When the PCF receives a service request such as the Npcf_UEPolicyControl_Create request, PCF may generate the PDUID for the UE as well as a validity timer indicating when the PDUID will be expired. PCF then sends the mapping between the PDUID and UE ID to the DDNMF as well as the validity timer. When a PDUID is expired, PCF may generate a new one for the UE and send it to the DDNMF.

In another embodiment, the PCF does not proactively send the PDUID to the DDNMF. Instead, the DDNMF may request the PDUID of a UE from the PCF when the DDNMF receives a Announce/Monitor request from the UE.

Figure 4:
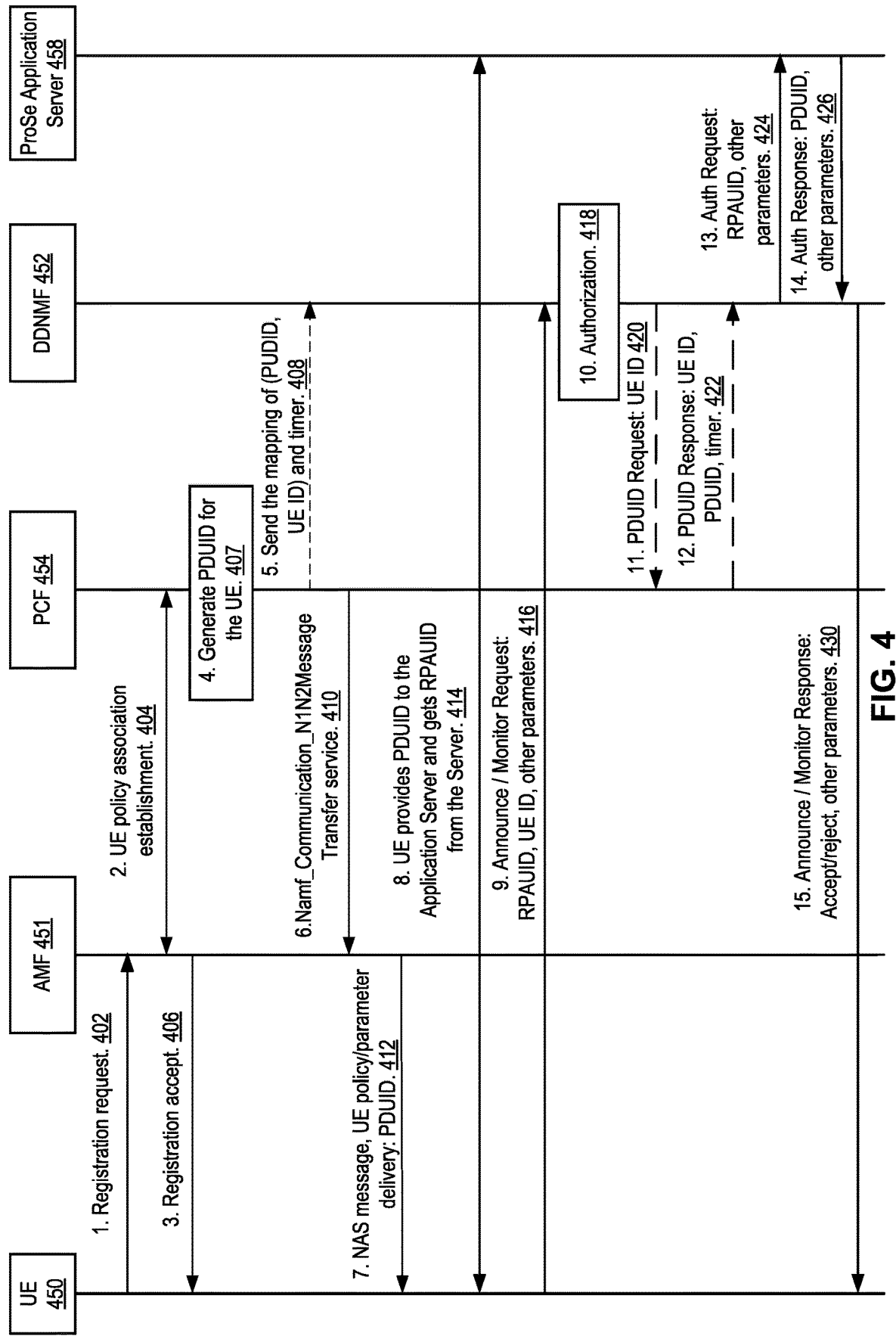
FIG. 4 shows operations to support restricted Proximity-based Services (ProSe) direct discovery per a first set of embodiments.

FIG. 4 shows operations to support restricted Proximity-based Services (ProSe) discovery per the first set of embodiments. At reference 402 (Step 1), a UE 450 transmits a registration request to an AMF 451, which interacts with a PCF 454 to perform a UE policy association establishment procedure at reference 404 (Step 2). The UE policy association establishment procedure may use the Npcf_UEPolicyControl_Create service (including the Npcf_UEPolicyControl_Create request and response discussed herein). AMF 451 and PCF 454 use the service to set up association. At reference 406 (Step 3), AMF 451 transmits a registration acknowledgement to UE 450 to accept the registration when it determines that the registration is acceptable. Otherwise, AMF 451 may reject the registration when it is not acceptable (not shown).

At reference 407 (Step 4), PCF 454 generates a PDUID for UE 450. The PDUID may be generated based on the UE ID of UE 450, which provides the UE ID in its registration request at reference 402. PCF 454 may store and maintain the PDUID in a database. For example, the PDUID may be stored in a data structure within the database, e.g., a map, a list, an array, a file, and/or a table. The PDUID is mapped to the UE ID in the data structure. In some embodiments, the UE ID is to be mapped to the PDUID and RPAUID of UE 450, for example, the mapping may be in the form of {UE ID, (PDUID, RPAUID)}. The database may maintain a large number of mappings between UE IDs and their corresponding PDUIDs and RPAUIDs accessible to the PCF.

Optionally, PCF 454 may transmit the mapping of the generated PDUID and the UE ID to a DDNMF 452, along with a validity timer, at reference 408 (Step 5). A validity timer, as described herein, indicates a time period, expiration of which causes the information carried in a message along with the validity timer invalid (e.g., a PDUID). Once the PDUID becomes invalid, the transmitting NF such as PCF 454 may generate and transmit another PDUID mapping to the UE ID.

At reference 410 (Step 6), PCF 454 uses a Namf_Communication_N1N2MessageTransfer service message to provide UE parameters to AMF 451. The UE parameters may include the PDUID and a validity timer. The Namf_Communication_N1N2MessageTransfer service is a message transfer service message defined in standards such as 3GPP. The UE parameters may include the PDUID. At reference 412 (Step 7), AMF 451 transmits a non-access stratum (NAS) message including the PDUID to the terminal device. The NAS message may also include other UE policy and/or parameters.

Reference 402 to 412 show the operations of a UE registration process through which UE 450 obtains a PDUID to support its restricted ProSe direct discovery. UE 450 may communicate with a ProSe application server 458 to obtain a corresponding RPAUID by providing its PDUID at reference 414 (Step 8).

When UE 450 is ready to perform restricted ProSe direct discovery, at reference 416 (Step 9), UE 450 transmits an announce request or a monitor request including the RPAUID of UE 450, the UE ID, and other parameters to DDNMF 452. The other parameters include the ones defined in standards such as 3GPP. At reference 418 (Step 10), DDNMF 452 verifies that UE 450 is authorized to perform restricted ProSe direct discovery, and if UE 450 fails the authorization (not shown), DDNMF 452 responds to the announce/monitor request with a reject message.

When UE 450 is confirmed to be authorized to perform the restricted ProSe direct discovery at reference 418, the operation continues, and if DDNMF 452 does not have the mapping PUDID corresponding to the UE ID (e.g., not get the UE ID at reference 408), DDNMF 452 may transmit a PDUID request message with the UE ID to PCF 454 at reference 420 (Step 11) to obtain the PDUID, and PCF 454 may respond at reference 422 (Step 12) with a PDUID response message, including the requested PDUID mapping to the PDUID, and the response message may also include the UE ID, and/or a validity timer.

If DDNMF 452 needs authorization of the RPAUID of UE 450, it obtains the authorization from a ProSe application server, otherwise it may determine how to respond to the announce/monitor request on its own. In the former case, DDNMF 452 transmits an authorization request to the ProSe application server 458 at reference 424 (Step 13), where the authorization request includes the RPAUID of UE 450 and other parameters as defined in standards such as 3GPP. At reference 426 (Step 14), the ProSe application server 458 transmits a response including the PDUID of UE 450 and other parameters as defined in standards such as 3GPP. The authorization response indicates whether UE 450 is authorized to perform restricted ProSe direct discovery. DDNMF 452 verifies whether the PDUID received from the ProSe application server 458 at reference 426 matches the PDUID it obtained from PCF 454 for UE 450.

At reference 430 (Step 15), DDNMF 452 responds to UE 450 with a announce/monitor response message, indicating the announce/monitor request (sent at reference 416) is accepted or rejected. DDNMF 452 responds with an accept message and other parameters as defined in standards such as 3GPP if the PDUIDs (the one received from the ProSe application server 458 and the one received from PCF 454, at reference 408 or 422) match, otherwise it responds with a reject message.

Note that although the operations are labels in Steps 1 to 15, some of the steps may be performed out of order. For example, Steps 11 and 12 may occur after obtaining the RPAUID at step 14. Additionally, some steps are optional as explained herein above, e.g., getting the PUDID may be performed alternatively (through operation at reference 408 or 422). Additionally, the authorization to the ProSe application server 458 (operations at 424 and 426) may be optional in some embodiments as well.

In the first set of embodiments, PDUID is generated and maintained by PCF 454. This approach is based on PCF being the network function to replace the DPF component of the ProSe function in 4G implementation. PCF is an existing network function in 5G implementation and adding the additional functionality for restricted ProSe direct discovery is intuitive and efficient, but it is not the only network function (NF) that such functionality may be implemented, and the second set of embodiments uses another NF.

A Second Set of Embodiments

Figure 5:
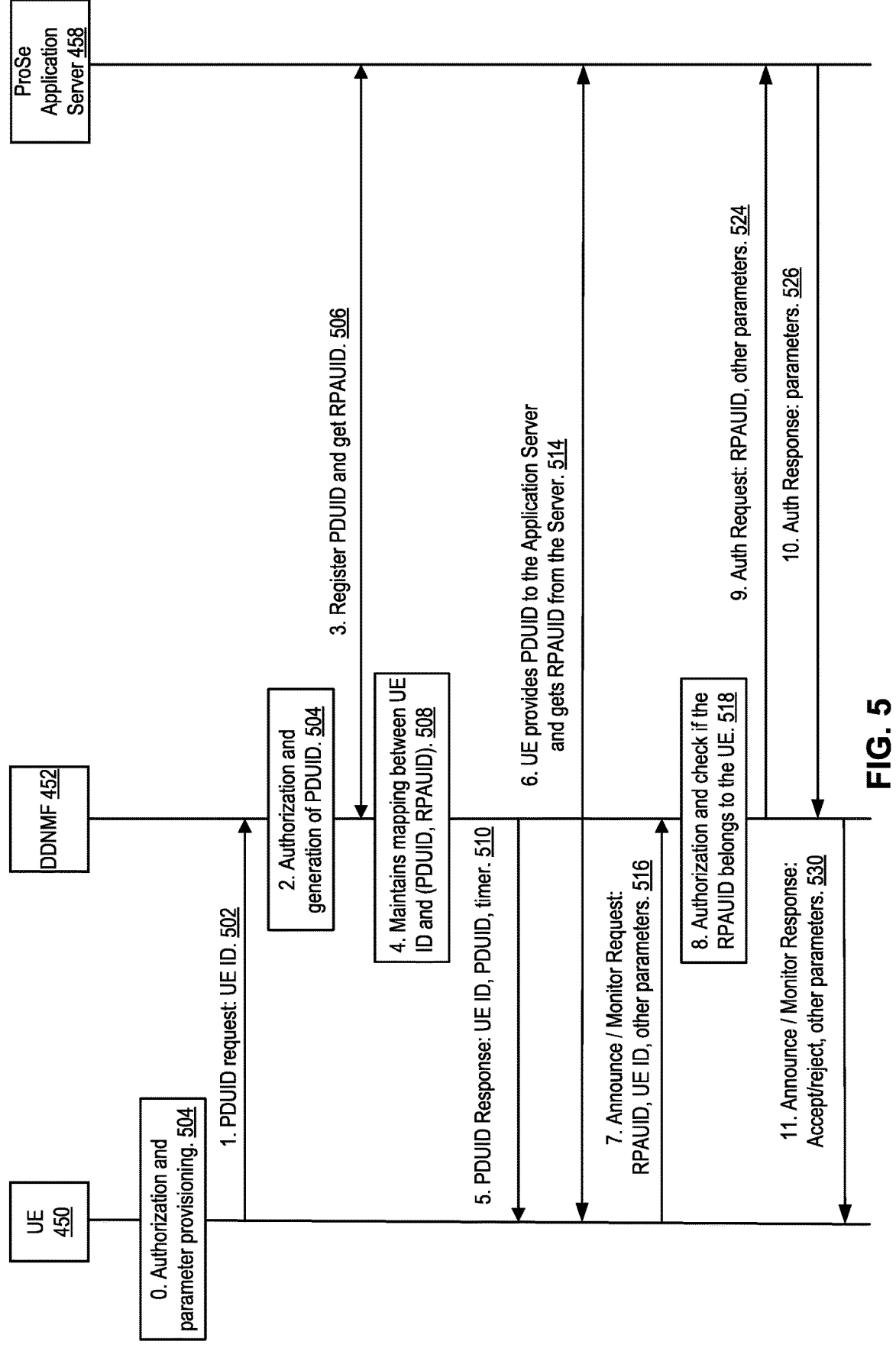
FIG. 5 shows operations to support restricted Proximity-based Services (ProSe) direct discovery per a second set of embodiments.

In the second set of embodiments, the DDNMF in a system manages the PDUID instead of PCF in the system as in the first set of embodiments. FIG. 5 shows operations to support restricted Proximity-based Services (ProSe) discovery per the second set of embodiments.

At reference 502 (Step 0), the authorization and parameter provisioning of UE 450 may happen during the UE registration phase. In this step, the UE gets the addresses (e.g., the IP addresses) of DDNMF 452 and ProSe application server 458. Since it is not within a procedure to specifically support restricted ProSe direct discovery, it is designated as Step 0 (a condition for the restricted ProSe direct discovery support).

At reference 504 (Step 1), UE 450 transmits a PDUID request message to DDNMF 452 to request a PDUID, and the PDUID request message indicates the UE ID of UE 450. At reference 504 (Step 2), DDNMF 452 verifies whether UE 450 is authorized to do restricted ProSe direct discovery, and if UE 450 is authorized, DDNMF 452 generates the PDUID for UE 450. The DDNMF 452 stores the generated PDUID.

At reference 506 (Step 3), DDNMF 452 contacts the ProSe application server 458 to register the PDUID; the ProSe application server 458 generates a RPAUID based on the PDUID received from DDNMF 452 and transmits the RPAUID back to DDNMF 452 when the registration is successful.

At reference 508 (Step 4), DDNMF 452 maintains the mapping between the PDUID and the PDUID and RPAUID of UE 450. The mapping may be stored in a data structure within the database, e.g., a map, a list, an array, a file, and/or a table. For example, the mapping may be in the form of {UE ID, (PDUID, RPAUID)}. Similar to the maintenance of the mappings in PCF 454 in the first set of embodiments, the database may maintain a large number of mappings between UE IDs and their corresponding PDUIDs and RPAUIDs accessible to the DDNMF in the second set of embodiments.

At reference 510 (Step 5), DDNMF 452 transmits a PDUID response message. The PDUID response message may include the UE ID, the PDUID, a validity time, and other parameters as defined in standards such as 3GPP.

At reference 514 (Step 6), UE 450 may communicate with a ProSe application server 458 to obtain a corresponding RPAUID by providing its PDUID, similar to the operation at reference 414.

At reference 516 (Step 7), UE 450 transmits an announce request or a monitor request including the RPAUID of UE 450, the UE ID, and other parameters to DDNMF 452, similar to the operation at reference 416.

At reference 518 (Step 8), DDNMF 452 verifies that UE 450 is authorized to perform restricted ProSe direct discovery; and additionally, DDNMF 452 checks whether if the RPAUID provided by UE 450 at reference 516 matches the mapping maintained at reference 508 (i.e., whether the RPAUID belongs to the UE). If either authorization or check fails (not shown), DDNMF 452 responds to the announce/monitor request with a reject message.

If both authorization and check passes, at reference 524 (Step 9), DDNMF 452 transmits an authorization request to the ProSe application server 458, where the authorization request includes the RPAUID of UE 450 and other parameters as defined in standards such as 3GPP, similar to operation at reference 424. At reference 526 (Step 10), the ProSe application server 458 transmits an authorization response message back, along with parameters as defined in standards such as 3GPP. The authorization response message indicates whether UE 450 is authorized to perform restricted ProSe direct discovery. The authorization response message at reference 526 may or may not indicates the PDUID, in contrast to the authorization response message at reference 426, which does indicate the PDUID. The reason that the PDUID is not needed in the response message at reference 526 is that DDNMF 452 knows the RPAUID belongs to the UE through the check at reference 518, therefore DDNMF 452 does not need PDUID from the ProSe application server 458 to verify the UE identity. At reference 530 (Step 11), DDNMF 452 responds to UE 450 with a announce/monitor response message, indicating the announce/monitor request (sent at reference 516) is accepted or rejected. The operation is similar to the one at reference 430 and is not repeated.

Similar to FIG. 4, some of the steps in FIG. 5 may be performed out of order, others may be optional.

Through the first and second sets of embodiments, a network function (NF) (in a 5G, 6G, or proprietary system) may maintain the mapping between UE IDs and corresponding PDUIDs (and RPAUID as well in some embodiments), so that the NF (e.g., PCF or DDNMF) may support restricted ProSe direct discovery and enable a smooth transition from legacy ProSe function in a 4G/LTE system into a network architecture with network nodes to support ProSe.

Operations at Network Functions (NFs) per Some Embodiments

FIG. 6 is a flow diagram to show operations at a first Network Function (NF) to support restricted Proximity-based Services (ProSe) direct discovery per the first set of embodiments. The operations support restricted ProSe direct discovery in a wireless network, where a terminal device communicates with another terminal device based on the restricted ProSe direct discovery, and where the wireless network is to assign one PDUID to the terminal device to identify the terminal device in the restricted ProSe direct discovery.

At reference 602, the first network function receives a request message including a UE identifier (UE ID), where the UE ID uniquely identifies the UE in the wireless network. At reference 604, the first network function generates a ProSe Discovery user equipment (UE) identifier (PDUID) for the UE ID based on the UE ID, and at reference 606, the first network function transmits a PDUID information message to a second NF, where the PDUID information message comprises the PDUID and a validity timer. The operations at reference 602, 604, and 606 are explained herein above relating to references 404, 406, and 408/422, respectively.

In some embodiments, the first NF comprises a policy control function (PCF) and the second NF comprises a Direct Discovery Name Management Function (DDNMF). In some embodiment, the request message comprises a UE policy association establishment message as explained herein above relating to reference 404.

In some embodiments, the request message is received from a third NF, where the third NF transmits the request message upon receiving a registration request from the terminal device. The operation is explained herein above relating to reference 402.

In some embodiments, the method continues at reference 608, and the first NF transmits a response message to the third NF in response to the request message, where the response message includes the PDUID, and where the third NF transmits a non-access stratum (NAS) message including the PDUID to the terminal device. In some embodiments, the response message comprises a message transfer service message. In some embodiments, the third NF comprises an Access and Mobility Management Function (AMF). These operations are explained herein above relating to references 410 and 412.

In some embodiments, the PDUID is obtained by the terminal device during a registration procedure of the terminal device. The registration procedure of the terminal devices is shown at references 402 to 412.

In some embodiments, the PDUID information message is transmitted in response to a PDUID request message transmitted from the second NF. The operation is explained herein above relating to reference 422.

In some embodiments, the second NF receives an announce or monitor request from the terminal device, where the announce or monitor request comprises the UE ID and a Restricted ProSe Application User ID (RPAUID), and where the second NF authorizes whether the terminal device may perform the restricted ProSe direct discovery. The operation is explained herein above relating to reference 416.

Figure 7:
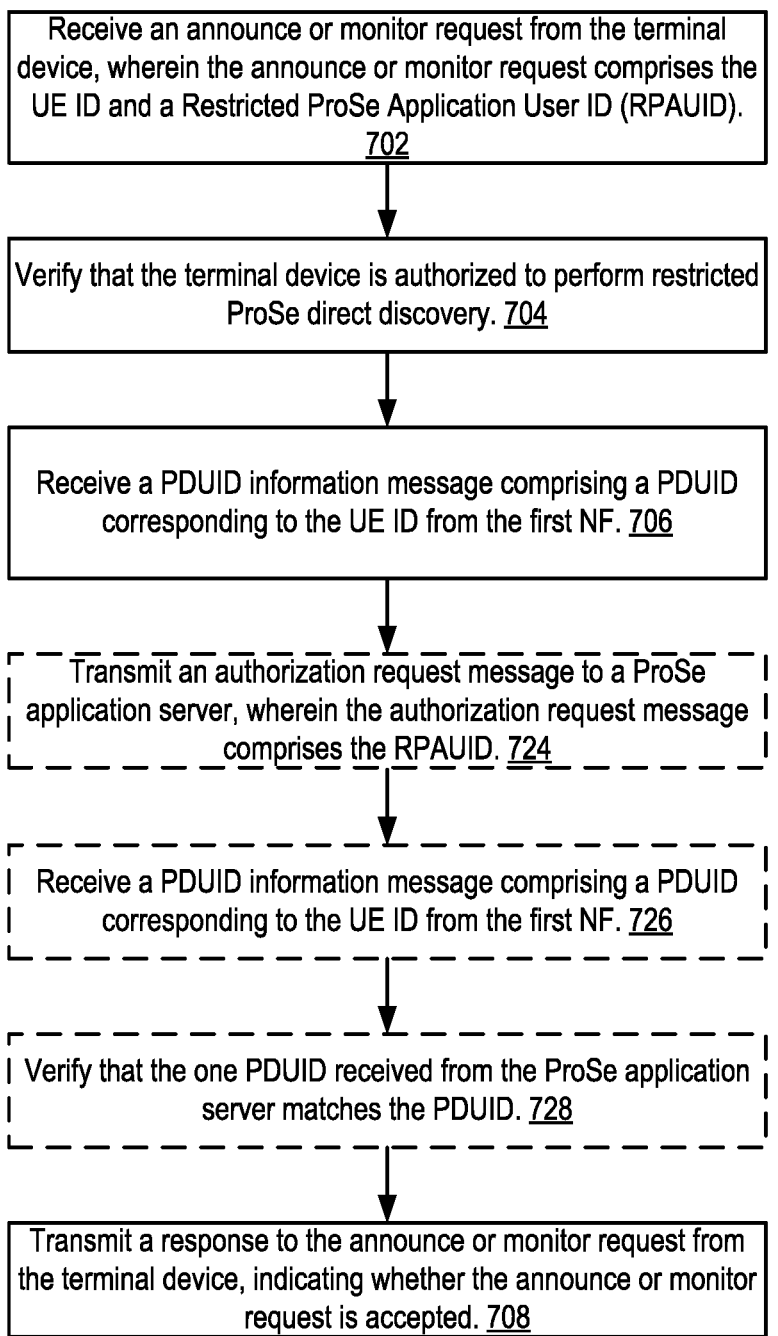
FIG. 7 is a flow diagram to show operations at a second Network Function (NF) to support restricted Proximity-based Services (ProSe) direct discovery per the first set of embodiments.

FIG. 7 is a flow diagram to show operations at a second Network Function (NF) to support restricted Proximity-based Services (ProSe) direct discovery per the first set of embodiments. The first and second NFs are the same as discussed relating to FIG. 6 and both operate in the first set of embodiments discussed herein. The first NF maintains PDUIDs for the wireless network, and the maintained PDU-IDs are generated through operations such as the ones explained at reference 407.

At reference 702, the second NF receives an announce or monitor request from the terminal device, where the announce or monitor request comprises the UE ID and a Restricted ProSe Application User ID (RPAUID). At reference 704, the second NF verifies that the terminal device is authorized to perform the restricted ProSe direct discovery. At reference 706, the second NF receives a PDUID information message comprising a PDUID corresponding to the UE ID from the first NF, and at reference 708, the second NF transmits a response to the announce or monitor request from the terminal device, indicating whether the announce or monitor request is accepted. These operations are explained herein above relating to references 416, 418, 408/422.

Similar to the operation in FIG. 6, the PDUID corresponding to the UE ID is received in response to a PDUID request message transmitting from the second NF to the first NF, where the PDUID request message comprises the UE ID in some embodiments. Additionally, the PDUID information message further comprises a validity timer that indicates a time period, expiration of which causes the first NF to transmit another PDUID information message.

In some embodiments, the method continues with the second NF transmitting an authorization request message to a ProSe application server, where the authorization request message comprises the RPAUID, the second NF then receives an authorization response message from the ProSe application server, where the authorization response message comprises one PDUID corresponding to the RPAUID according to the ProSe application server, and verifies that the one PDUID received from the ProSe application server matches the PDUID prior to accepting the announce or monitor request. These operations are explained herein above relating to references 424 and 426.

FIG. 8 is a flow diagram to show operations at a Network Function (NF) to support restricted Proximity-based Services (ProSe) direct discovery per the second set of embodiments. The operations support restricted ProSe direct discovery in a wireless network, where a terminal device communicates with another terminal device based on the restricted ProSe direct discovery, and where the wireless network is to assign one PDUID to the terminal device to identify the terminal device in the restricted ProSe direct discovery. In some embodiments, the NF comprises a Direct Discovery Name Management Function (DDNMF).

At reference 802, the NF receives a request message including a UE identifier (UE ID), where the UE ID uniquely identifies the UE in the wireless network. At reference 804, the NF verifies that the terminal device is authorized to perform the restricted ProSe direct discovery, and it generates ProSe Discovery user equipment (UE) identifier (PDUID) for the UE ID at reference 805 based on the UE ID. At reference 806, the NF interacts with a ProSe application server to register the PDUID at the ProSe application server and to obtain a Restricted ProSe Application User ID (RPAUID) corresponding to the PDUID. At reference 808, the NF transmits a response message including the UE ID, the PDUID, the RPAUID, and a validity timer. The operations at references 802 to 808 are explained herein above relating to references 502 to 508.

In some embodiments, the method continues with operations at reference 816, where the NF receives an announce or monitor request from the terminal device, where the announce or monitor request comprises the UE ID and the RPAUID. The NF verifies whether the RPAUID received from the terminal device matches the RPAUID in the mapping maintained for the terminal device at reference 818. When the two RPAUIDs match, the NF transmits an authorization request message at reference 824 to the ProSe application server, where the authorization request message comprises the RPAUID. At reference 826, the NF receives an authorization response message from the ProSe application server, and the NF transmits at reference 830 an announce or monitor response message to the terminal device based on the authorization response message. The operations at 816, 818, 824, 826, and 828 are explained herein relating to 516, 518, 524, 526, and 528, respectively.

In some embodiments, the NF maintains a mapping for the terminal device between the UE ID and a pair comprising the PDUID and RPAUID. In some embodiments, the authorization response message does not indicate the PDUID. In some embodiments, when the two RPAUIDs fails to match, an announce or monitor response to the terminal device based on match failure is transmitted.

In some embodiments relating to FIGS. 4 to 8, the UE ID is one of a subscription permanent identifier (SUPI) or a subscription concealed identifier (SUCI).

A Network Node Implementing Embodiments of the Invention

An electronic device stores and transmits (internally and/or with other electronic devices over a network) code (which is composed of software instructions and which is sometimes referred to as a computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical, or other form of propagated signals—such as carrier waves, infrared signals). Thus, an electronic device (e.g., a computer) includes hardware and software, such as a set of one or more processors (e.g., of which a processor is a microprocessor, controller, microcontroller, central processing unit, digital signal processor, application specific integrated circuit (ASIC), field programmable gate array (FPGA), other electronic circuitry, or a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed). When the electronic device is turned on, that part of the code that is to be executed by the processor(s) of the electronic device is typically copied from the slower non-volatile memory into volatile memory (e.g., dynamic random-access memory (DRAM), static random-access memory (SRAM)) of the electronic device. Typical electronic devices also include a set of one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of (1) receiving data from other electronic devices over a wireless connection and/or (2) sending data out to other devices through a wireless connection. This radio circuitry may include transmitter(s), receiver(s), and/or transceiver(s) suitable for radio frequency communication. The radio circuitry may convert digital data into a radio signal having the proper parameters (e.g., frequency, timing, channel, bandwidth, and so forth). The radio signal may then be transmitted through antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate with wire through plugging in a cable to a physical port connected to an NIC. One or more parts of an embodiment of the invention may be implemented using different combinations of software, firmware, and/or hardware.

A wireless communication network (or "wireless network," and the two terms are used interchangeably) is a network of electronic devices communicating using radio waves (electromagnetic waves within the frequencies 30 KHz-300 GHz). The wireless communications may follow wireless communication standards, such as new radio (NR), LTE-Advanced (LTE-A), LTE, wideband code division multiple access (WCDMA), High-Speed Packet Access (HSPA). Furthermore, the communications between the electronic devices such as network nodes and terminal devices in the wireless communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) communication protocols, and/or any other protocols either currently known or to be developed in the future. While LTE and NR are used as examples to describe embodiments of the invention, the invention may apply to other wireless communication networks, including LTE operating in unlicensed spectrums, Multefire systems, and IEEE 802.11 systems.

A network node or node (also referred to as a network device (ND), and these terms are used interchangeably in this disclosure) is an electronic device in a wireless communication network via which a wireless device accesses the network and receives services therefrom. One type of network node may refer to a base station (BS) or an access point (AP), for example, a node B (NodeB or NB), an evolved NodeB (eNodeB or eNB), a next generation node B (gNB), a remote radio unit (RRU), a radio header (RH), a remote radio head (RRH), a relay, and a low power node such as a femtocell and a picocell.

A terminal device may access a wireless communication network and receive services from the wireless communication network through a network node. A terminal device may also be referred to as a wireless device (WD), and the two terms are used interchangeably in this disclosure. A terminal device may be a subscriber station (SS), a portable subscriber Station, a mobile station (MS), an access terminal (AT), or other end user devices. An end user device (also referred to as end device, and the two terms are used interchangeably) may be one of a mobile phone, a cellular phone, a smart phone, a tablet, a wearable device, a personal digital assistant (PDA), a portable computer, an image capture terminal device (e.g., a digital camera), a gaming terminal device, a music storage and playback appliance, a smart appliance, a vehicle-mounted wireless terminal device, a smart speaker, and an Internet of Things (IoT) device. Terminal devices may be coupled (e.g., through customer premise equipment coupled to an access network (wired or wirelessly)) to edge NDs, which are coupled (e.g., through one or more core NDs) to other edge NDs, which are coupled to electronic devices acting as servers.

Figure 9:
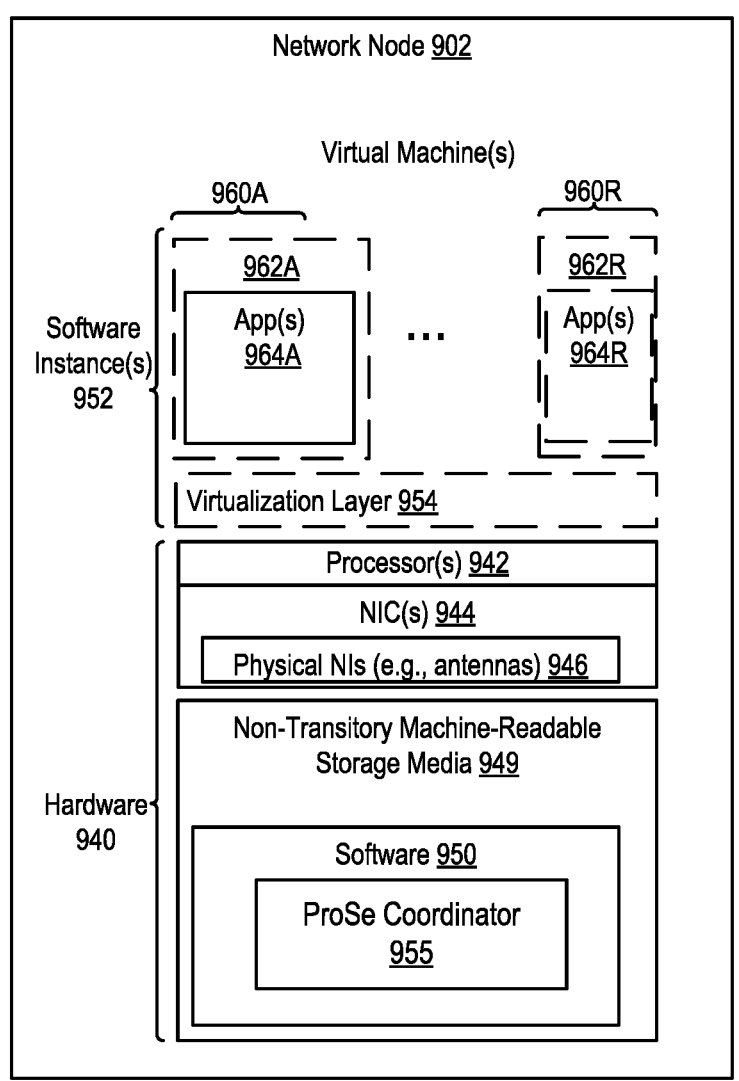
FIG. 9 shows a network node per some embodiments.

FIG. 9 shows a network node supporting ProSe per some embodiments. The network node 902 may be implemented using custom application-specific integrated-circuits (ASICs) as processors and a special-purpose operating system (OS), or common off-the-shelf (COTS) processors and a standard OS. In some embodiments, the network node 902 implements one or more logical entities (network functions) of the ProSe architecture shown in FIGS. 3 to 8 to interact with a terminal device (e.g., a UE). For example, the network node 902 may implement one or more of DDNMF and PCF.

The network node 902 includes hardware 940 comprising a set of one or more processors 942 (which are typically COTS processors or processor cores or ASICs) and physical NIs 946, as well as non-transitory machine-readable storage media 949 having stored therein software 950. During operation, the one or more processors 942 may execute the software 950 to instantiate one or more sets of one or more applications 964A-R. While one embodiment does not implement virtualization, alternative embodiments may use different forms of virtualization. For example, in one such alternative embodiment, the virtualization layer 954 represents the kernel of an operating system (or a shim executing on a base operating system) that allows for the creation of multiple instances 962A-R called software containers that may each be used to execute one (or more) of the sets of applications 964A-R. The multiple software containers (also called virtualization engines, virtual private servers, or jails) are user spaces (typically a virtual memory space) that are separate from each other and separate from the kernel space in which the operating system is run. The set of applications running in a given user space, unless explicitly allowed, cannot access the memory of the other processes. In another such alternative embodiment, the virtualization layer 954 represents a hypervisor (sometimes referred to as a virtual machine monitor (VMM)) or a hypervisor executing on top of a host operating system, and each of the sets of applications 964A-R run on top of a guest operating system within an instance 962A-R called a virtual machine (which may in some cases be considered a tightly isolated form of software container) that run on top of the hypervisor—the guest operating system and application may not know that they are running on a virtual machine as opposed to running on a "bare metal" host electronic device, or through para-virtualization the operating system and/or application may be aware of the presence of virtualization for optimization purposes. In yet other alternative embodiments, one, some, or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 940, directly on a hypervisor (in which case the unikernel is sometimes described as running within a LibOS virtual machine), or in a software container, embodiments can be implemented fully with unikernels running directly on a hypervisor represented by virtualization layer 954, unikernels running within software containers represented by instances 962A-R, or as a combination of unikernels and the above-described techniques (e.g., unikernels and virtual machines both run directly on a hypervisor, unikernels, and sets of applications that are run in different software containers).

The software 950 contains a ProSe coordinator 955 that performs operations described with reference to FIGS. 4 to 8. For example, the ProSe coordinator 955 may perform the operations of the first, second, and/or the third network functions (NFs) described relating to FIGS. 6 to 8, or a combination two or more of the first, second, and third NFs discussed herein. The ProSe coordinator 955 may be instantiated within the applications 964A-R. The instantiation of the one or more sets of one or more applications 964A-R, as well as virtualization if implemented, are collectively referred to as software instance(s) 952. Each set of applications 964A-R, corresponding virtualization construct (e.g., instance 962A-R) if implemented, and that part of the hardware 940 that executes them (be it hardware dedicated to that execution and/or time slices of hardware temporally shared), forms a separate virtual electronic device 960A-R.

A network interface (NI) may be physical or virtual. In the context of IP, an interface address is an IP address assigned to an NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address).

A Wireless Network Per Some Embodiments

Figure 10:
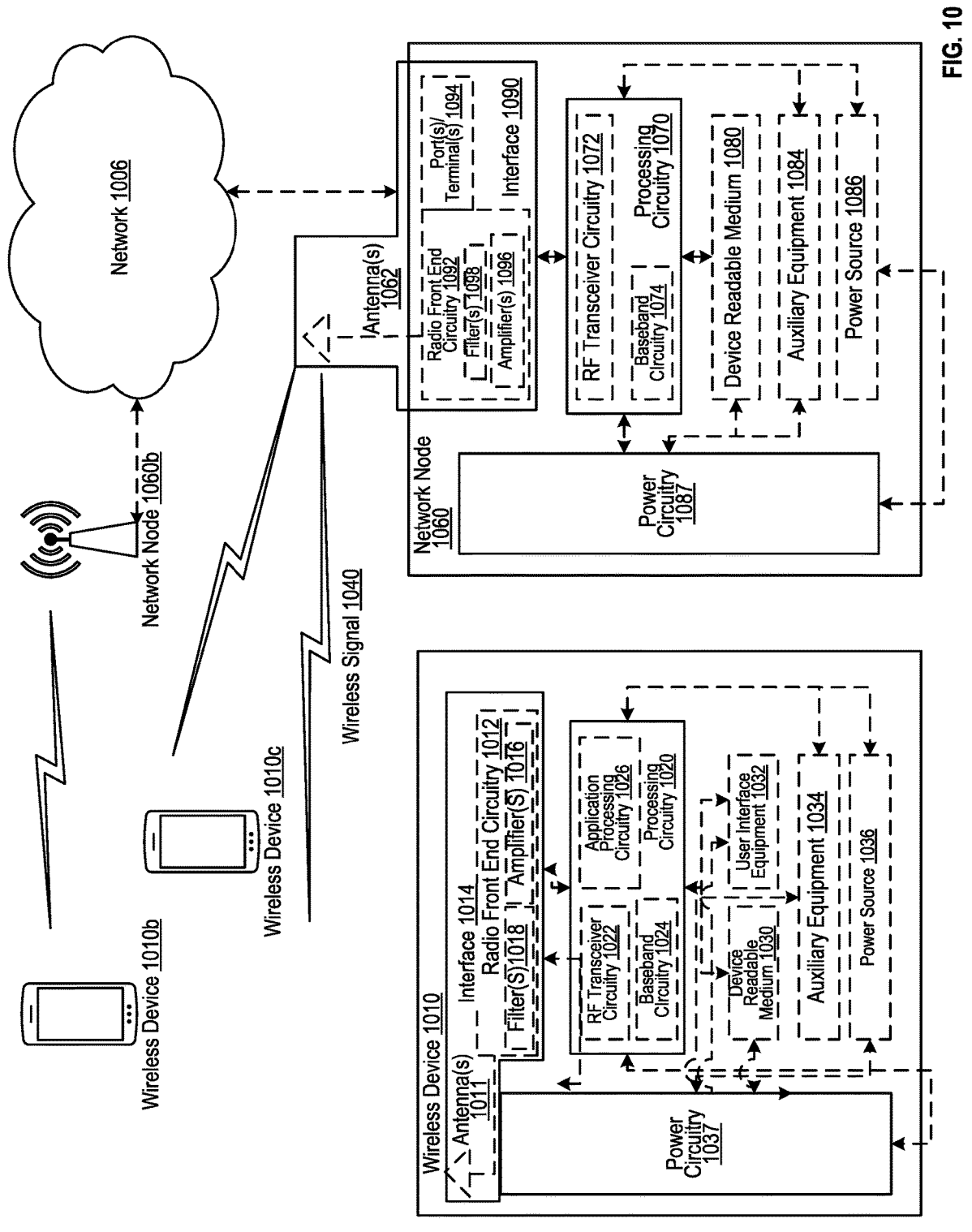
FIG. 10 shows a wireless network per some embodiments.

Although the subject matter described herein may be implemented in any appropriate type of system using any suitable components, the embodiments disclosed herein are described in relation to a wireless network, such as the example wireless network illustrated in FIG. 10. For simplicity, the wireless network of FIG. 10 only depicts network 1006, network nodes 1061 and 1060b, and WDs 1010, 1010b, and 1010c. In practice, a wireless network may further include any additional elements suitable to support communication between wireless devices or between a wireless device and another communication device, such as a landline telephone, a service provider, or any other network node or end device. Of the illustrated components, network node 1060 and wireless device (WD) 1010 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1006 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1060 and WD 1010 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

Network node 1060 and WD 1010 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay.

A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 10, network node 1060 includes processing circuitry 1070, device readable medium 1080, interface 1090, auxiliary equipment 1084, power source 1086, power circuitry 1087, and antenna 1062. Although network node 1060 illustrated in the example wireless network of FIG. 10 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1060 are depicted as single boxes located within a larger box, or nested within multiple boxes, in practice, a network node may comprise multiple different physical components that make up a single illustrated component (e.g., device readable medium 1080 may comprise multiple separate hard drives as well as multiple RAM modules).

Similarly, network node 1060 may be composed of multiple physically separate components (e.g., a NodeB component and an RNC component, or a BTS component and a BSC component, etc.), which may each have their own respective components. In certain scenarios in which network node 1060 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1060 may be configured to support multiple radio access technologies (RATs). In such embodiments, some components may be duplicated (e.g., separate device readable medium 1080 for the different RATs) and some components may be reused (e.g., the same antenna 1062 may be shared by the RATs). Network node 1060 may also include multiple sets of the various illustrated components for different wireless technologies integrated into network node 1060, such as, for example, GSM, WCDMA, LTE, NR, WiFi, or Bluetooth wireless technologies. These wireless technologies may be integrated into the same or different chip or set of chips and other components within network node 1060.

Processing circuitry 1070 is configured to perform any determining, calculating, or similar operations (e.g., certain obtaining operations) described herein as being provided by a network node. These operations performed by processing circuitry 1070 may include processing information obtained by processing circuitry 1070 by, for example, converting the obtained information into other information, comparing the obtained information or converted information to information stored in the network node, and/or performing one or more operations based on the obtained information or converted information, and as a result of said processing making a determination.

Processing circuitry 1070 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1060 components, such as device readable medium 1080, network node 1060 functionality. For example, processing circuitry 1070 may execute instructions stored in device readable medium 1080 or in memory within processing circuitry 1070. Such functionality may include providing any of the various wireless features, functions, or benefits discussed herein. In some embodiments, processing circuitry 1070 may include a system on a chip (SoC).

In some embodiments, processing circuitry 1070 may include one or more of radio frequency (RF) transceiver circuitry 1072 and baseband processing circuitry 1074. In some embodiments, radio frequency (RF) transceiver circuitry 1072 and baseband processing circuitry 1074 may be on separate chips (or sets of chips), boards, or units, such as radio units and digital units. In alternative embodiments, part or all of RF transceiver circuitry 1072 and baseband processing circuitry 1074 may be on the same chip or set of chips, boards, or units.

In certain embodiments, some or all of the functionality described herein as being provided by a network node, base station, eNB or other such network nodes may be performed by processing circuitry 1070 executing instructions stored on device readable medium 1080 or memory within processing circuitry 1070. In alternative embodiments, some or all of the functionalities may be provided by processing circuitry 1070 without executing instructions stored on a separate or discrete device readable medium, such as in a hard-wired manner. In any of those embodiments, whether executing instructions stored on a device readable storage medium or not, processing circuitry 1070 can be configured to perform the described functionality. The benefits provided by such functionality are not limited to processing circuitry 1070 alone or to other components of network node 1060, but are enjoyed by network node 1060 as a whole, and/or by end users and the wireless network generally.

Device readable medium 1080 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1070. Device readable medium 1080 may store any suitable instructions, data or information, including a computer program, software, an application including one or more of logic, rules, code, tables, etc. and/or other instructions capable of being executed by processing circuitry 1070 and, utilized by network node 1060. Device readable medium 1080 may be used to store any calculations made by processing circuitry 1070 and/or any data received via interface 1090. In some embodiments, processing circuitry 1070 and device readable medium 1080 may be considered to be integrated. In some embodiments, device readable medium 1080 comprises the ProSe coordinator 955.

Interface 1090 is used in the wired or wireless communication of signaling and/or data between network node 1060, network 1006, and/or WDs 1010. As illustrated, interface 1090 comprises port(s)/terminal(s) 1094 to send and receive data, for example to and from network 1006 over a wired connection. Interface 1090 also includes radio front end circuitry 1092 that may be coupled to, or in certain embodiments a part of, antenna 1062. Radio front end circuitry 1092 comprises filters 1098 and amplifiers 1096. Radio front end circuitry 1092 may be connected to antenna 1062 and processing circuitry 1070. Radio front end circuitry may be configured to condition signals communicated between antenna 1062 and processing circuitry 1070. Radio front end circuitry 1092 may receive digital data that is to be sent out to other network nodes or WDs via a wireless connection. Radio front end circuitry 1092 may convert the digital data into a radio signal having the appropriate channel and bandwidth parameters using a combination of filters 1098 and/or amplifiers 1096. The radio signal may then be transmitted via antenna 1062. Similarly, when receiving data, antenna 1062 may collect radio signals which are then converted into digital data by radio front end circuitry 1092. The digital data may be passed to processing circuitry 1070. In other embodiments, the interface may comprise different components and/or different combinations of components.

In certain alternative embodiments, network node 1060 may not include separate radio front end circuitry 1092, instead, processing circuitry 1070 may comprise radio front end circuitry and may be connected to antenna 1062 without separate radio front end circuitry 1092. Similarly, in some embodiments, all or some of RF transceiver circuitry 1072 may be considered a part of interface 1090. In still other embodiments, interface 1090 may include one or more ports or terminals 1094, radio front end circuitry 1092, and RF transceiver circuitry 1072, as part of a radio unit (not shown), and interface 1090 may communicate with baseband processing circuitry 1074, which is part of a digital unit (not shown).

Antenna 1062 may include one or more antennas, or antenna arrays, configured to send and/or receive wireless signals. Antenna 1062 may be coupled to radio front end circuitry 1090 and may be any type of antenna capable of transmitting and receiving data and/or signals wirelessly. In some embodiments, antenna 1062 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line-of-sight antenna used to transmit/receive radio signals in a relatively straight line. In some instances, the use of more than one antenna may be referred to as MIMO. In certain embodiments, antenna 1062 may be separate from network node 1060 and may be connectable to network node 1060 through an interface or port.

Antenna 1062, interface 1090, and/or processing circuitry 1070 may be configured to perform any receiving operations and/or certain obtaining operations described herein as being performed by a network node. Any information, data and/or signals may be received from a wireless device, another network node and/or any other network equipment. Similarly, antenna 1062, interface 1090, and/or processing circuitry 1070 may be configured to perform any transmitting operations described herein as being performed by a network node. Any information, data and/or signals may be transmitted to a wireless device, another network node and/or any other network equipment.

Power circuitry 1087 may comprise, or be coupled to, power management circuitry and is configured to supply the components of network node 1060 with power for performing the functionality described herein. Power circuitry 1087 may receive power from power source 1086. Power source 1086 and/or power circuitry 1087 may be configured to provide power to the various components of network node 1060 in a form suitable for the respective components (e.g., at a voltage and current level needed for each respective component). Power source 1086 may either be included in, or external to, power circuitry 1087 and/or network node 1060. For example, network node 1060 may be connectable to an external power source (e.g., an electricity outlet) via an input circuitry or interface such as an electrical cable, whereby the external power source supplies power to power circuitry 1087. As a further example, power source 1086 may comprise a source of power in the form of a battery or battery pack which is connected to, or integrated in, power circuitry 1087. The battery may provide backup power should the external power source fail. Other types of power sources, such as photovoltaic devices, may also be used.

Alternative embodiments of network node 1060 may include additional components beyond those shown in FIG. 10 that may be responsible for providing certain aspects of the network node's functionality, including any of the functionality described herein and/or any functionality necessary to support the subject matter described herein. For example, network node 1060 may include user interface equipment to allow input of information into network node 1060 and to allow output of information from network node 1060. This may allow a user to perform diagnostic, maintenance, repair, and other administrative functions for network node 1060.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and the WD transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1010 includes antenna 1011, interface 1014, processing circuitry 1020, device readable medium 1030, user interface equipment 1032, auxiliary equipment 1034, power source 1036 and power circuitry 1037. WD 1010 may include multiple sets of one or more of the illustrated components for different wireless technologies supported by WD 1010, such as GSM, WCDMA, LTE, NR, WiFi, WiMAX, or Bluetooth wireless technologies, just to mention a few. These wireless technologies may be integrated into the same or different chips or set of chips as other components within WD 1010.

Antenna 1011 may include one or more antennas or antenna arrays, configured to send and/or receive wireless signals, and is connected to interface 1014. In certain alternative embodiments, antenna 1011 may be separate from WD 1010 and be connectable to WD 1010 through an interface or port. Antenna 1011, interface 1014, and/or processing circuitry 1020 may be configured to perform any receiving or transmitting operations described herein as being performed by a WD. Any information, data and/or signals may be received from a network node and/or another WD. In some embodiments, radio front end circuitry and/or antenna 1011 may be considered an interface.

As illustrated, interface 1014 comprises radio front end circuitry 1012 and antenna 1011. Radio front end circuitry 1012 comprise one or more filters 1018 and amplifiers 1016. Radio front end circuitry 1014 is connected to antenna 1011 and processing circuitry 1020, and is configured to condition signals communicated between antenna 1011 and processing circuitry 620. Radio front end circuitry 1012 may be coupled to or a part of antenna 1011. In some embodiments, WD 1010 may not include separate radio front end circuitry 1012; rather, processing circuitry 1020 may comprise radio front end circuitry and may be connected to antenna 1011. Similarly, in some embodiments, some or all of RF transceiver circuitry 1022 may be considered a part of interface 1014. Radio front end circuitry 1012 may receive digital data that is to be sent out to other network nodes or WDs via a wireless connection. Radio front end circuitry 1012 may convert the digital data into a radio signal having the appropriate channel and bandwidth parameters using a combination of filters 1018 and/or amplifiers 1016. The radio signal may then be transmitted via antenna 1011. Similarly, when receiving data, antenna 1011 may collect radio signals which are then converted into digital data by radio front end circuitry 1012. The digital data may be passed to processing circuitry 1020. In other embodiments, the interface may comprise different components and/or different combinations of components.

Processing circuitry 1020 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1010 components, such as device readable medium 1030, WD 1010 functionality. Such functionality may include providing any of the various wireless features or benefits discussed herein. For example, processing circuitry 1020 may execute instructions stored in device readable medium 1030 or in memory within processing circuitry 1020 to provide the functionality disclosed herein.

As illustrated, processing circuitry 1020 includes one or more of RF transceiver circuitry 1022, baseband processing circuitry 1024, and application processing circuitry 1026. In other embodiments, the processing circuitry may comprise different components and/or different combinations of components. In certain embodiments processing circuitry 1020 of WD 1010 may comprise a SOC. In some embodiments, RF transceiver circuitry 1022, baseband processing circuitry 1024, and application processing circuitry 1026 may be on separate chips or sets of chips. In alternative embodiments, part or all of baseband processing circuitry 1024 and application processing circuitry 1026 may be combined into one chip or set of chips, and RF transceiver circuitry 1022 may be on a separate chip or set of chips. In still alternative embodiments, part or all of RF transceiver circuitry 1022 and baseband processing circuitry 1024 may be on the same chip or set of chips, and application processing circuitry 1026 may be on a separate chip or set of chips. In yet other alternative embodiments, part or all of RF transceiver circuitry 1022, baseband processing circuitry 1024, and application processing circuitry 1026 may be combined in the same chip or set of chips. In some embodiments, RF transceiver circuitry 1022 may be a part of interface 1014. RF transceiver circuitry 1022 may condition RF signals for processing circuitry 1020.

In certain embodiments, some or all of the functionality described herein as being performed by a WD may be provided by processing circuitry 1020 executing instructions stored on device readable medium 1030, which in certain embodiments may be a computer-readable storage medium. In alternative embodiments, some or all of the functionalities may be provided by processing circuitry 1020 without executing instructions stored on a separate or discrete device readable storage medium, such as in a hard-wired manner. In any of those particular embodiments, whether executing instructions stored on a device readable storage medium or not, processing circuitry 1020 can be configured to perform the described functionality. The benefits provided by such functionality are not limited to processing circuitry 1020 alone or to other components of WD 1010, but are enjoyed by WD 1010 as a whole, and/or by end users and the wireless network generally.

Processing circuitry 1020 may be configured to perform any determining, calculating, or similar operations (e.g., certain obtaining operations) described herein as being performed by a WD. These operations, as performed by processing circuitry 1020, may include processing information obtained by processing circuitry 1020 by, for example, converting the obtained information into other information, comparing the obtained information or converted information to information stored by WD 1010, and/or performing one or more operations based on the obtained information or converted information, and as a result of said processing making a determination.

Device readable medium 1030 may be operable to store a computer program, software, an application including one or more of logic, rules, code, tables, etc. and/or other instructions capable of being executed by processing circuitry 1020. Device readable medium 1030 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1020. In some embodiments, processing circuitry 1020 and device readable medium 1030 may be considered to be integrated.

User interface equipment 1032 may provide components that allow for a human user to interact with WD 1010. Such interaction may be of many forms, such as visual, audial, tactile, etc. User interface equipment 1032 may be operable to produce output to the user and to allow the user to provide input to WD 1010. The type of interaction may vary depending on the type of user interface equipment 1032 installed in WD 1010. For example, if WD 1010 is a smart phone, the interaction may be via a touch screen; if WD 1010 is a smart meter, the interaction may be through a screen that provides usage (e.g., the number of gallons used) or a speaker that provides an audible alert (e.g., if smoke is detected). User interface equipment 1032 may include input interfaces, devices and circuits, and output interfaces, devices and circuits. User interface equipment 1032 is configured to allow input of information into WD 1010, and it is connected to processing circuitry 1020 to allow processing circuitry 1020 to process the input information. User interface equipment 1032 may include, for example, a microphone, a proximity or other sensor, keys/buttons, a touch display, one or more cameras, a USB port, or other input circuitry. User interface equipment 1032 is also configured to allow output of information from WD 1010, and to allow processing circuitry 1020 to output information from WD 1010. User interface equipment 1032 may include, for example, a speaker, a display, vibrating circuitry, a USB port, a headphone interface, or other output circuitry. Using one or more input and output interfaces, devices, and circuits, of user interface equipment 1032, WD 1010 may communicate with end users and/or the wireless network and allow them to benefit from the functionality described herein.

Auxiliary equipment 1034 is operable to provide more specific functionality which may not be generally performed by WDs. This may comprise specialized sensors for doing measurements for various purposes, interfaces for additional types of communication such as wired communications etc. The inclusion and type of components of auxiliary equipment 1034 may vary depending on the embodiment and/or scenario.

Power source 1036 may, in some embodiments, be in the form of a battery or battery pack. Other types of power sources, such as an external power source (e.g., an electricity outlet), photovoltaic devices or power cells, may also be used. WD 1010 may further comprise power circuitry 1037 for delivering power from power source 1036 to the various parts of WD 1010 which need power from power source 1036 to carry out any functionality described or indicated herein. Power circuitry 1037 may in certain embodiments comprise power management circuitry. Power circuitry 1037 may additionally or alternatively be operable to receive power from an external power source; in which case WD 1010 may be connectable to the external power source (such as an electricity outlet) via input circuitry or an interface such as an electrical power cable. Power circuitry 1037 may also in certain embodiments be operable to deliver power from an external power source to power source 1036. This may be, for example, for the charging of power source 1036. Power circuitry 1037 may perform any formatting, converting, or other modification to the power from power source 636 to make the power suitable for the respective components of WD 1010 to which power is supplied.

Figure 11:
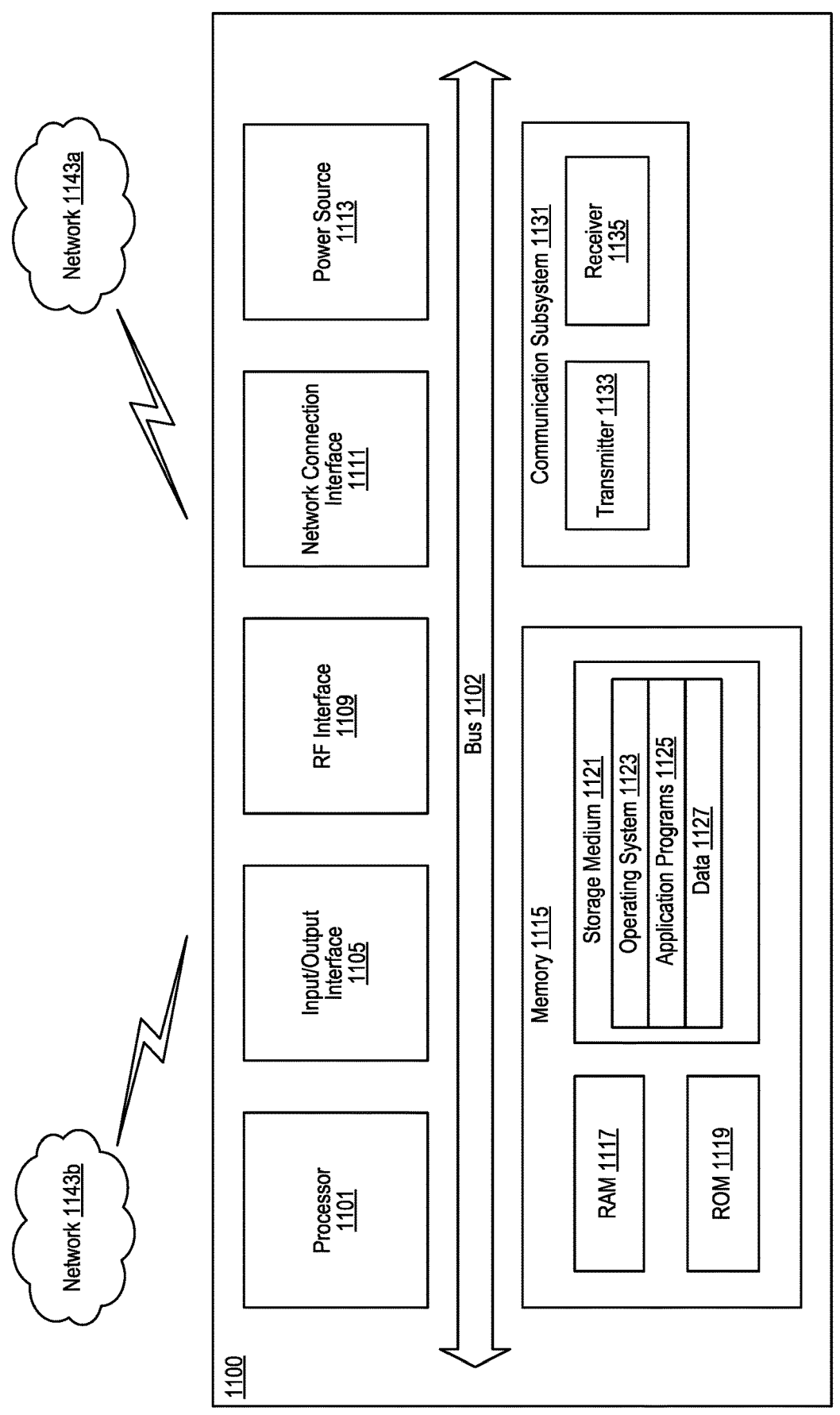
FIG. 11 shows a User Equipment (UE) per some embodiments.

FIG. 11 shows one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 1100 may be any UE identified by the $3^{rd}$ Generation Partnership Project (3GPP), including a NB-IoT UE, a machine type communication (MTC) UE, and/or an enhanced MTC (eMTC) UE. UE 1100, as illustrated in FIG. 11, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 11 is a UE, the components discussed herein are equally applicable to a WD, and vice-versa.

In FIG. 11, UE 1100 includes processing circuitry 1101 that is operatively coupled to input/output interface 1105, radio frequency (RF) interface 1109, network connection interface 1111, memory 1115 including random access memory (RAM) 1117, read-only memory (ROM) 1119, and storage medium 1121 or the like, communication subsystem 1131, power source 1113, and/or any other component, or any combination thereof. Storage medium 1121 includes operating system 1123, application program 1125, and data 1127. In other embodiments, storage medium 1121 may include other similar types of information. Certain UEs may utilize all of the components shown in FIG. 11, or only a subset of the components. The level of integration between the components may vary from one UE to another UE. Further, certain UEs may contain multiple instances of a component, such as multiple processors, memories, transceivers, transmitters, receivers, etc. In one embodiment, application program 1125 includes ProSe coordinator 955 discussed herein above.

In FIG. 11, processing circuitry 1101 may be configured to process computer instructions and data. Processing circuitry 1101 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1101 may include two central processing units (CPUs). Data may be information in a form suitable for use by a computer.

In the depicted embodiment, input/output interface 1105 may be configured to provide a communication interface to an input device, output device, or input and output device. UE 1100 may be configured to use an output device via input/output interface 1105. An output device may use the same type of interface port as an input device. For example, a USB port may be used to provide input to and output from UE 1100. The output device may be a speaker, a sound card, a video card, a display, a monitor, a printer, an actuator, an emitter, a smartcard, another output device, or any combination thereof. UE 1100 may be configured to use an input device via input/output interface 1105 to allow a user to capture information into UE 1100. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 11, RF interface 1109 may be configured to provide a communication interface to RF components such as a transmitter, a receiver, and an antenna. Network connection interface 1111 may be configured to provide a communication interface to network 1143*a*. Network 1143*a* may encompass wired and/or wireless networks such as a local-area network (LAN), a wide-area network (WAN), a computer network, a wireless network, a telecommunications network, another like network or any combination thereof. For example, network 1143*a* may comprise a Wi-Fi network. Network connection interface 1111 may be configured to include a receiver and a transmitter interface used to communicate with one or more other devices over a communication network according to one or more communication protocols, such as Ethernet, TCP/IP, SONET, ATM, or the like. Network connection interface 1111 may implement receiver and transmitter functionality appropriate to the communication network links (e.g., optical, electrical, and the like). The transmitter and receiver functions may share circuit components, software or firmware, or alternatively may be implemented separately.

RAM 1117 may be configured to interface via bus 1102 to processing circuitry 1101 to provide storage or caching of data or computer instructions during the execution of software programs such as the operating system, application programs, and device drivers. ROM 1119 may be configured to provide computer instructions or data to processing circuitry 1101. For example, ROM 1119 may be configured to store invariant low-level system code or data for basic system functions such as basic input and output (I/O), startup, or reception of keystrokes from a keyboard that are stored in a non-volatile memory. Storage medium 1121 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1121 may be configured to include operating system 1123, application program 1125 such as a web browser application, a widget or gadget engine or another application, and data file 1127. Storage medium 1121 may store, for use by UE 1100, any of a variety of various operating systems or combinations of operating systems.

Storage medium 1121 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1121 may allow UE 1100 to access computer-executable instructions, application programs or the like, stored on transitory or non-transitory memory media, to off-load data, or to upload data. An article of manufacture, such as one utilizing a communication system may be tangibly embodied in storage medium 1121, which may comprise a device readable medium.

In FIG. 11, processing circuitry 1101 may be configured to communicate with network 1143*b* using communication subsystem 1131. Network 1143*a* and network 1143*b* may be the same network or networks or different network or networks. Communication subsystem 1131 may be configured to include one or more transceivers used to communicate with network 1143*b*. For example, communication subsystem 1131 may be configured to include one or more transceivers used to communicate with one or more remote transceivers of another device capable of wireless communication such as another WD, UE, or base station of a radio access network (RAN) according to one or more communication protocols, such as IEEE 802.7, CDMA, WCDMA, GSM, LTE, UTRAN, WiMax, or the like. Each transceiver may include transmitter 1133 and/or receiver 1135 to implement transmitter or receiver functionality, respectively, appropriate to the RAN links (e.g., frequency allocations and the like). Further, transmitter 1133 and receiver 1135 of each transceiver may share circuit components, software or firmware, or alternatively may be implemented separately.

In the illustrated embodiment, the communication functions of communication subsystem 1131 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1131 may include cellular communication, Wi-Fi communication, Bluetooth communication, and GPS communication. Network 1143*b* may encompass wired and/or wireless networks such as a local-area network (LAN), a wide-area network (WAN), a computer network, a wireless network, a telecommunications network, another like network or any combination thereof. For example, network 1143*b* may be a cellular network, a Wi-Fi network, and/or a near-field network. Power source 1113 may be configured to provide alternating current (AC) or direct current (DC) power to components of UE 1100.

The features, benefits and/or functions described herein may be implemented in one of the components of UE 1100 or partitioned across multiple components of UE 1100. Further, the features, benefits, and/or functions described herein may be implemented in any combination of hardware, software or firmware. In one example, communication subsystem 1131 may be configured to include any of the components described herein. Further, processing circuitry 1101 may be configured to communicate with any of such components over bus 1102. In another example, any of such components may be represented by program instructions stored in memory that when executed by processing circuitry 1101 perform the corresponding functions described herein. In another example, the functionality of any of such components may be partitioned between processing circuitry 1101 and communication subsystem 1131. In another example, the non-computationally intensive functions of any of such components may be implemented in software or firmware and the computationally intensive functions may be implemented in hardware.

Figure 12:
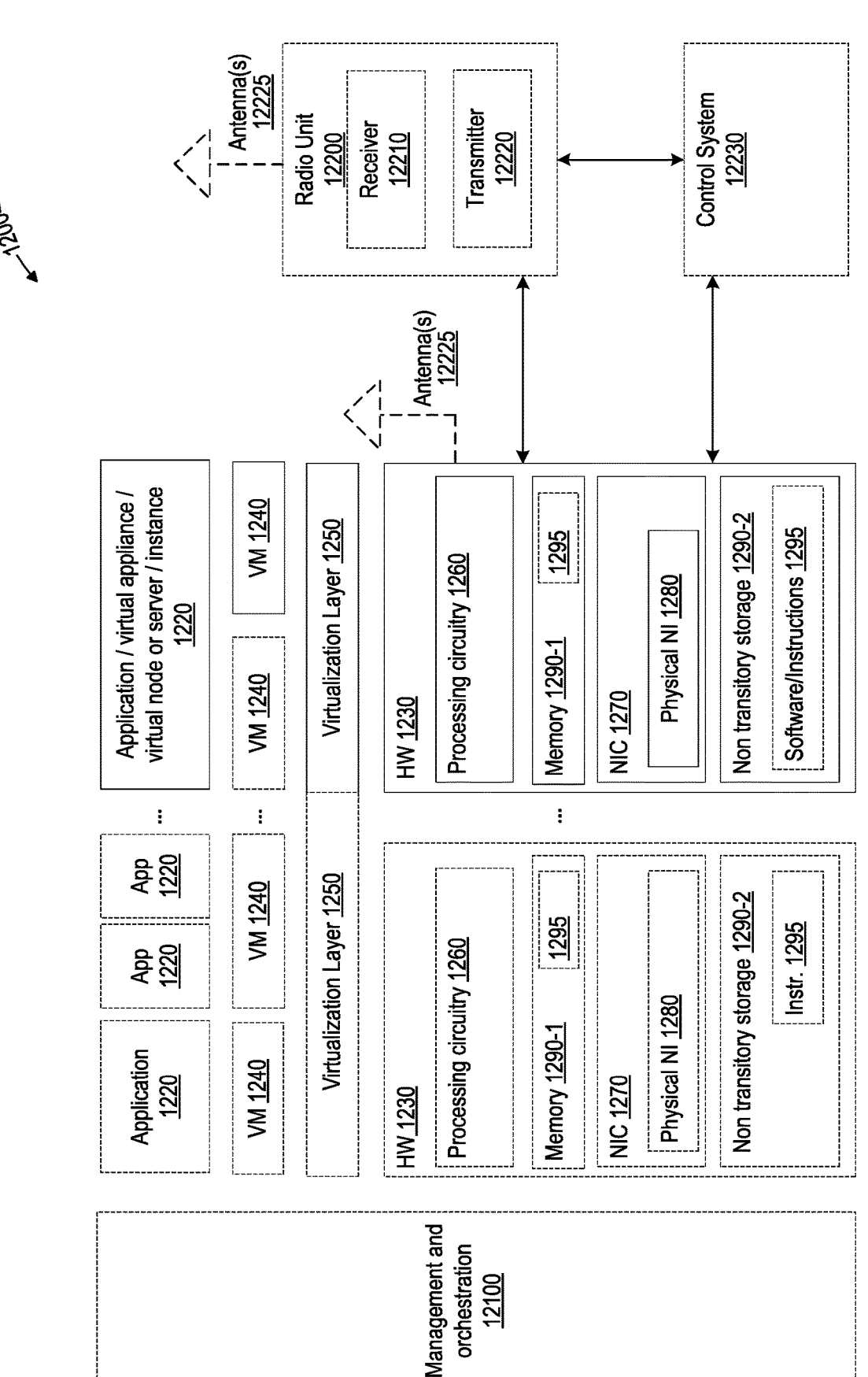
FIG. 12 shows a virtualization environment per some embodiments.

FIG. 12 is a schematic block diagram illustrating a virtualization environment 1200 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1200 hosted by one or more of hardware nodes 1230. Further, in embodiments in which the virtual node is not a radio access node or does not require radio connectivity (e.g., a core network node), then the network node may be entirely virtualized.

The functions may be implemented by one or more applications 1220 (which may alternatively be called software instances, virtual appliances, network functions, virtual nodes, virtual network functions, etc.) operative to implement some of the features, functions, and/or benefits of some of the embodiments disclosed herein. Applications 1220 are run in virtualization environment 1200 which provides hardware 1230 comprising processing circuitry 1260 and memory 1290. Memory 1290 contains instructions 1295 executable by processing circuitry 1260 whereby application 1220 is operative to provide one or more of the features, benefits, and/or functions disclosed herein.

Virtualization environment 1200, comprises general-purpose or special-purpose network hardware devices 1230 comprising a set of one or more processors or processing circuitry 1260, which may be commercial off-the-shelf (COTS) processors, dedicated Application Specific Integrated Circuits (ASICs), or any other type of processing circuitry including digital or analog hardware components or special purpose processors. Each hardware device may comprise memory 1290-1 which may be non-persistent memory for temporarily storing instructions 1295 or software executed by processing circuitry 1260. Each hardware device may comprise one or more network interface controllers (NICs) 1270, also known as network interface cards, which include physical network interface 1280. Each hardware device may also include non-transitory, persistent, machine-readable storage media 1290-2 having stored therein software 1295 and/or instructions executable by processing circuitry 1260. Software 1295 may include any type of software including software for instantiating one or more virtualization layers 1250 (also referred to as hypervisors), software to execute virtual machines 1240 as well as software allowing it to execute functions, features and/or benefits described in relation with some embodiments described herein.

Virtual machines 1240, comprise virtual processing, virtual memory, virtual networking or interface and virtual storage, and may be run by a corresponding virtualization layer 1250 or hypervisor. Different embodiments of the instance of virtual appliance 1220 may be implemented on one or more of virtual machines 1240, and the implementations may be made in different ways.

During operation, processing circuitry 1260 executes software 1295 to instantiate the hypervisor or virtualization layer 1250, which may sometimes be referred to as a virtual machine monitor (VMM). Virtualization layer 1250 may present a virtual operating platform that appears like networking hardware to virtual machine 1240.

As shown in FIG. 12, hardware 1230 may be a standalone network node with generic or specific components. Hardware 1230 may comprise antenna 12225 and may implement some functions via virtualization. Alternatively, hardware 1230 may be part of a larger cluster of hardware (e.g., in a data center or customer premise equipment (CPE)) where many hardware nodes work together and are managed via management and orchestration (MANO) 12100, which, among others, oversees lifecycle management of applications 1220.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 1240 may be a software implementation of a physical machine that runs programs as if they were executing on a physical, non-virtualized machine. Each of virtual machines 1240, and that part of hardware 1230 that executes that virtual machine, be it hardware dedicated to that virtual machine and/or hardware shared by that virtual machine with others of the virtual machines 1240, forms a separate virtual network element (VNE).

Still in the context of NFV, Virtual Network Function (VNF) is responsible for handling specific network functions that run in one or more virtual machines 1240 on top of hardware networking infrastructure 1230 and corresponds to application 1220 in FIG. 12.

In some embodiments, one or more radio units 12200 that each include one or more transmitters 12220 and one or more receivers 12210 may be coupled to one or more antennas 12225. Radio units 12200 may communicate directly with hardware nodes 1230 via one or more appropriate network interfaces and may be used in combination with the virtual components to provide a virtual node with radio capabilities, such as a radio access node or a base station.

In some embodiments, some signaling can be effected with the use of control system 8230 which may alternatively be used for communication between the hardware nodes 1230 and radio units 12200.

Figure 13:
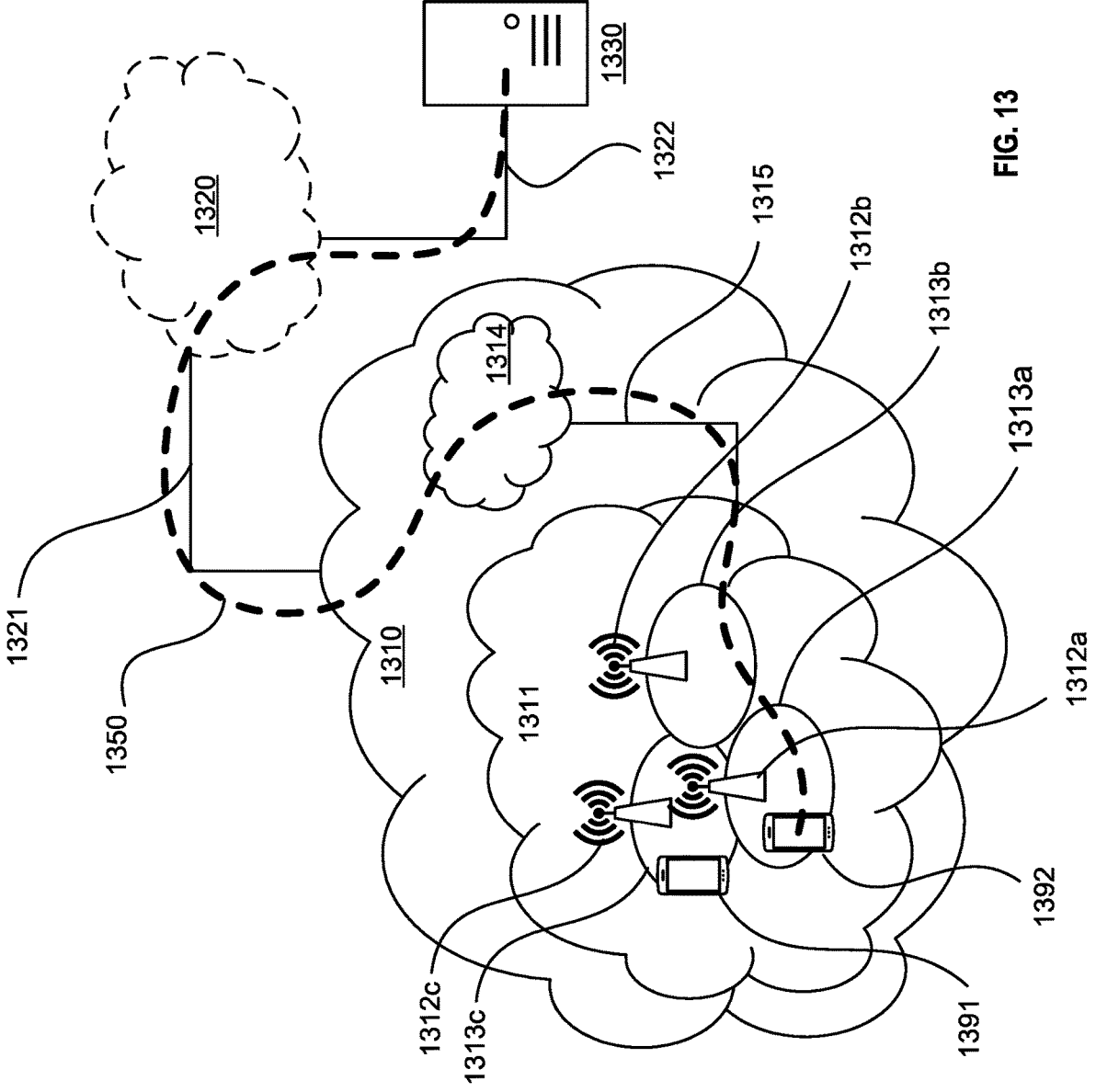
FIG. 13 shows a telecommunication network connected via an intermediate network to a host computer per some embodiments.

With reference to FIG. 13, per some embodiments, a communication system includes telecommunication network 1310, such as a 3GPP-type cellular network, which comprises access network 1311, such as a radio access network, and core network 1314. Access network 1311 comprises a plurality of base stations 1312a, 1312b, 1312c, such as NBs, eNBs, gNBs or other types of wireless access points, each defining a corresponding coverage area 1313a, 1313b, 1313c. Each base station 1312a, 1312b, 1312c is connectable to core network 1314 over a wired or wireless connection 1315. A first UE 1391 located in coverage area 1313c is configured to wirelessly connect to, or be paged by, the corresponding base station 1312c. A second UE 1392 in coverage area 1313a is wirelessly connectable to the corresponding base station 1312a. While a plurality of UEs 1391, 1392 are illustrated in this example, the disclosed embodiments are equally applicable to a situation where a sole UE is in the coverage area or where a sole UE is connecting to the corresponding base station 1312.

Telecommunication network 1310 is itself connected to host computer 1330, which may be embodied in the hardware and/or software of a standalone server, a cloud-implemented server, a distributed server or as processing resources in a server farm. Host computer 1330 may be under the ownership or control of a service provider, or it may be operated by the service provider or on behalf of the service provider. Connections 1321 and 1322 between telecommunication network 1310 and host computer 1330 may extend directly from core network 1314 to host computer 1330 or may go via an optional intermediate network 1320. Intermediate network 1320 may be one of, or a combination of more than one of, a public, private or hosted network; intermediate network 1320, if any, may be a backbone network or the Internet; in particular, intermediate network 1320 may comprise two or more sub-networks (not shown).

The communication system of FIG. 13 as a whole enables connectivity between the connected UEs 1391, 1392 and host computer 1330. The connectivity may be described as an over-the-top (OTT) connection 1350. Host computer 1330 and the connected UEs 1391, 1392 are configured to communicate data and/or signaling via OTT connection 1350, using access network 1311, core network 1314, any intermediate network 1320 and possible further infrastructure (not shown) as intermediaries. OTT connection 1350 may be transparent in the sense that the participating communication devices through which OTT connection 1350 passes are unaware of routing of uplink and downlink communications. For example, base station 1312 may not or need not be informed about the past routing of an incoming downlink communication with data originating from host computer 1330 to be forwarded (e.g., handed over) to a connected UE 1391. Similarly, base station 1312 need not be aware of the future routing of an outgoing uplink communication originating from the UE 1391 towards the host computer 1330.

Example implementations, in accordance with an embodiment, of the UE, base station and host computer discussed in the preceding paragraphs will now be described with reference to FIG. 14. In communication system 1400, host computer 1410 comprises hardware 1415 including communication interface 1416 configured to set up and maintain a wired or wireless connection with an interface of a different communication device of communication system 1400. Host computer 1410 further comprises processing circuitry 1418, which may have storage and/or processing capabilities. In particular, processing circuitry 1418 may comprise one or more programmable processors, application-specific integrated circuits, field programmable gate arrays or combinations of these (not shown) adapted to execute instructions. Host computer 1410 further comprises software 1411, which is stored in or accessible by host computer 1410 and executable by processing circuitry 1418. Software 1411 includes host application 1412. Host application 1412 may be operable to provide a service to a remote user, such as UE 1430 connecting via OTT connection 1450 terminating at UE 1430 and host computer 1410. In providing the service to the remote user, host application 1412 may provide user data which is transmitted using OTT connection 1450.

Communication system 1400 further includes base station 1420 provided in a telecommunication system and comprising hardware 1425 enabling it to communicate with host computer 1410 and with UE 1430. Hardware 1425 may include communication interface 1426 for setting up and maintaining a wired or wireless connection with an interface of a different communication device of communication system 1400, as well as radio interface 1427 for setting up and maintaining at least wireless connection 1470 with UE 1430 located in a coverage area (not shown in FIG. 14) served by base station 1420. Communication interface 1426 may be configured to facilitate connection 1460 to host computer 1410. Connection 1460 may be direct, or it may pass through a core network (not shown in FIG. 14) of the telecommunication system and/or through one or more intermediate networks outside the telecommunication system. In the embodiment shown, hardware 1425 of base station 1420 further includes processing circuitry 1428, which may comprise one or more programmable processors, application-specific integrated circuits, field programmable gate arrays or combinations of these (not shown) adapted to execute instructions. Base station 1420 further has software 1421 stored internally or accessible via an external connection.

Communication system 1400 further includes UE 1430 already referred to. The hardware 1435 may include radio interface 1437 configured to set up and maintain wireless connection 1470 with a base station serving a coverage area in which UE 1430 is currently located. Hardware 1435 of UE 1430 further includes processing circuitry 1438, which may comprise one or more programmable processors, application-specific integrated circuits, field programmable gate arrays or combinations of these (not shown) adapted to execute instructions. UE 1430 further comprises software 1431, which is stored in or accessible by UE 1430 and executable by processing circuitry 1438. Software 1431 includes client application 1432. Client application 1432 may be operable to provide a service to a human or non-human user via UE 1430, with the support of host computer 1410. In host computer 1410, an executing host application 1412 may communicate with the executing client application 1432 via OTT connection 1450 terminating at UE 1430 and host computer 1410. In providing the service to the user, client application 1432 may receive request data from host application 1412 and provide user data in response to the request data. OTT connection 1450 may transfer both the request data and the user data. Client application 1432 may interact with the user to generate the user data that it provides.

Figure 14:
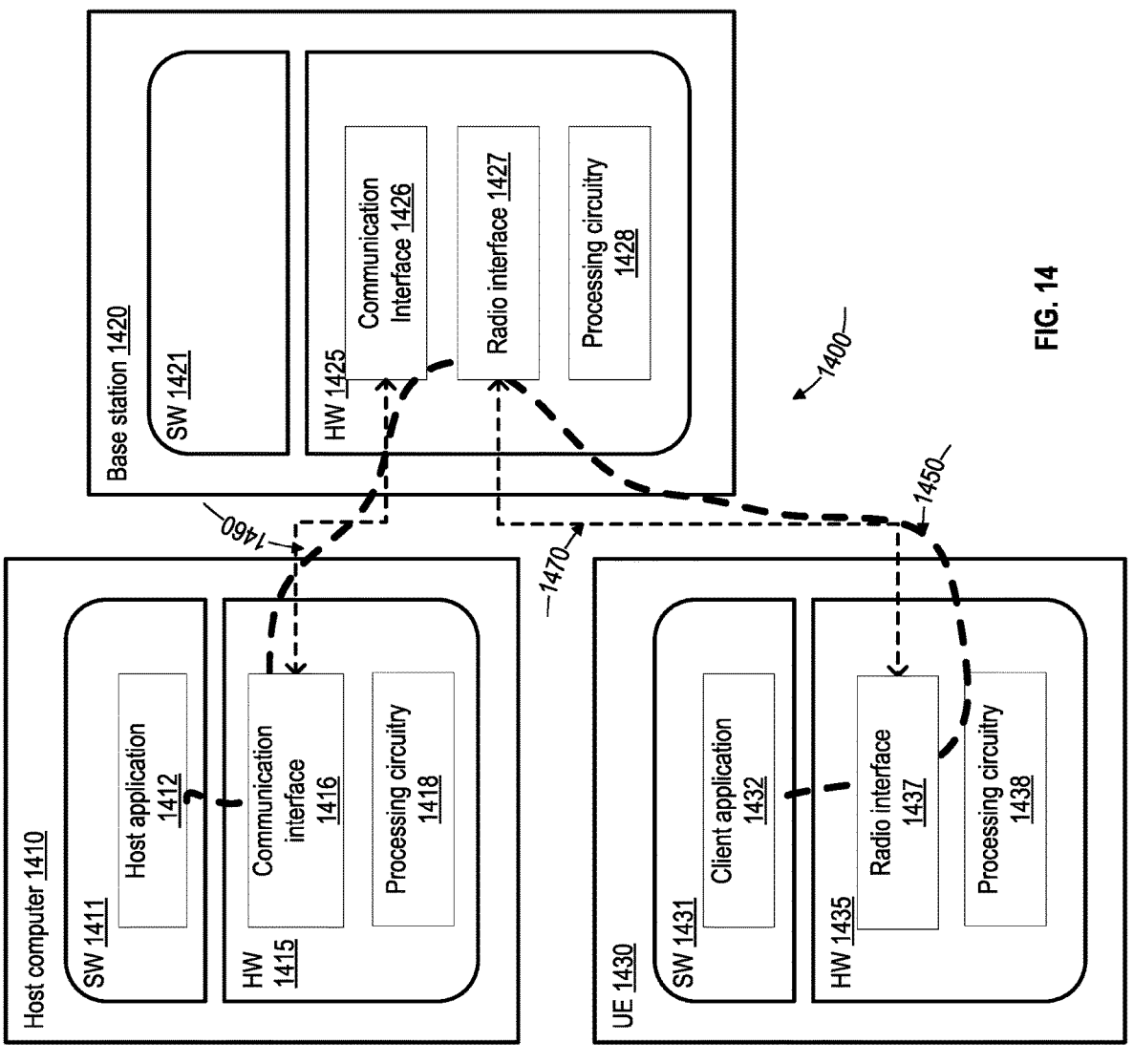
FIG. 14 shows a host computer communicating via a base station with a user equipment over a partially wireless connection per some embodiments.

It is noted that host computer 1410, base station 1420 and UE 1430 illustrated in FIG. 14 may be similar or identical to host computer 1330, one of base stations 1312a, 1312b, 1312c and one of UEs 1391, 1392 of FIG. 13, respectively. This is to say, the inner workings of these entities may be as shown in FIG. 14 and independently, the surrounding network topology may be that of FIG. 13.

In FIG. 14, OTT connection 1450 has been drawn abstractly to illustrate the communication between host computer 1410 and UE 1430 via base station 1420, without explicit reference to any intermediary devices and the precise routing of messages via these devices. Network infrastructure may determine the routing, which it may be configured to hide from UE 1430 or from the service provider operating host computer 1410, or both. While OTT connection 1450 is active, the network infrastructure may further take decisions by which it dynamically changes the routing (e.g., on the basis of load balancing consideration or reconfiguration of the network).

Wireless connection 1470 between UE 1430 and base station 1420 is in accordance with the teachings of the embodiments described throughout this disclosure. One or more of the various embodiments improve the performance of OTT services provided to UE 1430 using OTT connection 1450, in which wireless connection 1470 forms the last segment.

A measurement procedure may be provided for the purpose of monitoring data rate, latency and other factors on which the one or more embodiments improve. There may further be an optional network functionality for reconfiguring OTT connection 1450 between host computer 1410 and UE 1430, in response to variations in the measurement results. The measurement procedure and/or the network functionality for reconfiguring OTT connection 1450 may be implemented in software 1411 and hardware 1415 of host computer 1410 or in software 1431 and hardware 1435 of UE 1430, or both. In embodiments, sensors (not shown) may be deployed in or in association with communication devices through which OTT connection 1450 passes; the sensors may participate in the measurement procedure by supplying values of the monitored quantities exemplified above, or supplying values of other physical quantities from which software 1411, 1431 may compute or estimate the monitored quantities. The reconfiguring of OTT connection 1450 may include message format, retransmission settings, preferred routing etc.; the reconfiguring need not affect base station 1420, and it may be unknown or imperceptible to base station 1420. Such procedures and functionalities may be known and practiced in the art. In certain embodiments, measurements may involve proprietary UE signaling facilitating host computer 1410's measurements of throughput, propagation times, latency and the like. The measurements may be implemented in that software 1411 and 1431 causes messages to be transmitted, in particular empty or 'dummy' messages, using OTT connection 1450 while it monitors propagation times, errors etc.

Figure 15:
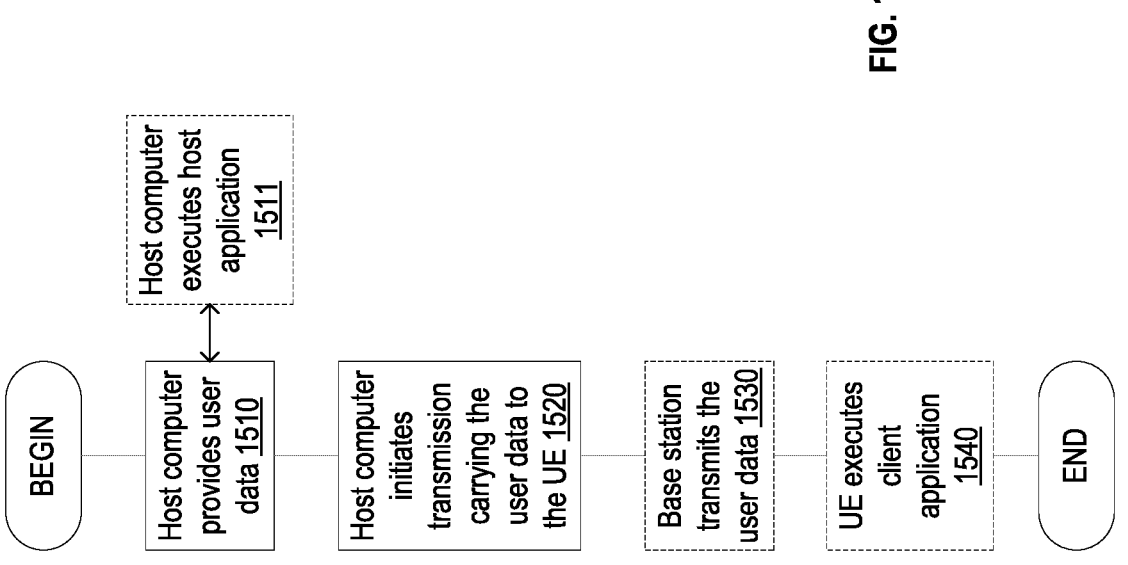
FIG. 15 shows a method implemented in a communication system including a host computer, a base station and a user equipment per some embodiments.

FIG. 15 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 15 will be included in this section. In step 1510, the host computer provides user data. In substep 1511 (which may be optional) of step 1510, the host computer provides the user data by executing a host application. In step 1520, the host computer initiates a transmission carrying the user data to the UE. In step 1530 (which may be optional), the base station transmits to the UE the user data which was carried in the transmission that the host computer initiated, in accordance with the teachings of the embodiments described throughout this disclosure. In step 1540 (which may also be optional), the UE executes a client application associated with the host application executed by the host computer.

Figure 16:
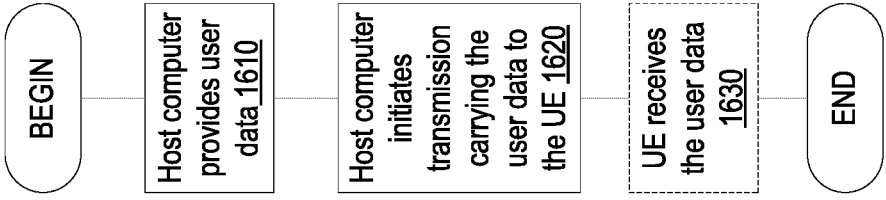
FIG. 16 shows a method implemented in a communication system including a host computer, a base station and a user equipment per some embodiments.

FIG. 16 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 16 will be included in this section. In step 1610 of the method, the host computer provides user data. In an optional substep (not shown) the host computer provides the user data by executing a host application. In step 1620, the host computer initiates a transmission carrying the user data to the UE. The transmission may pass via the base station, in accordance with the teachings of the embodiments described throughout this disclosure. In step 1630 (which may be optional), the UE receives the user data carried in the transmission.

Figure 17:
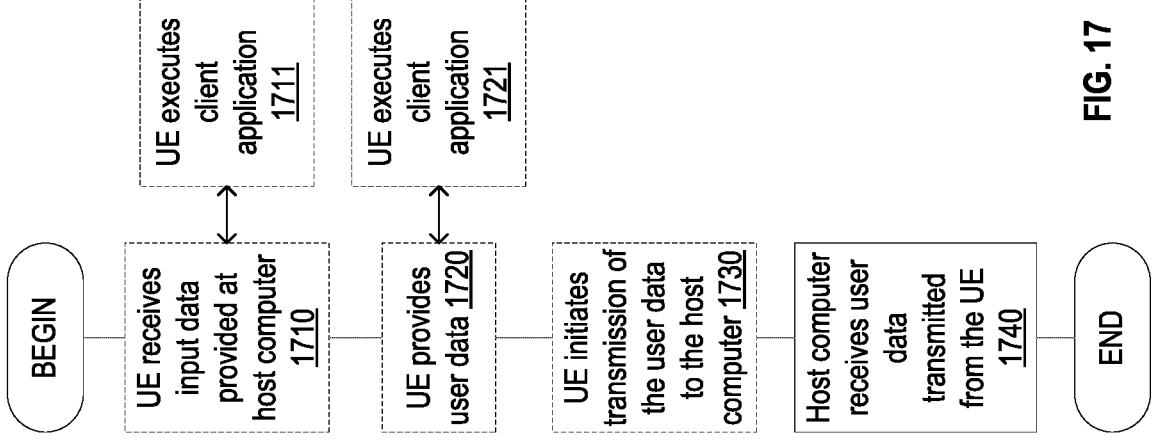
FIG. 17 shows a method implemented in a communication system including a host computer, a base station and a user equipment per some embodiments.

FIG. 17 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 17 will be included in this section. In step 1710 (which may be optional), the UE receives input data provided by the host computer. Additionally or alternatively, in step 1720, the UE provides user data. In substep 1721 (which may be optional) of step 1720, the UE provides the user data by executing a client application. In substep 1711 (which may be optional) of step 1710, the UE executes a client application which provides the user data in reaction to the received input data provided by the host computer. In providing the user data, the executed client application may further consider user input received from the user. Regardless of the specific manner in which the user data was provided, the UE initiates, in substep 1730 (which may be optional), transmission of the user data to the host computer. In step 1740 of the method, the host computer receives the user data transmitted from the UE, in accordance with the teachings of the embodiments described throughout this disclosure.

Figure 18:
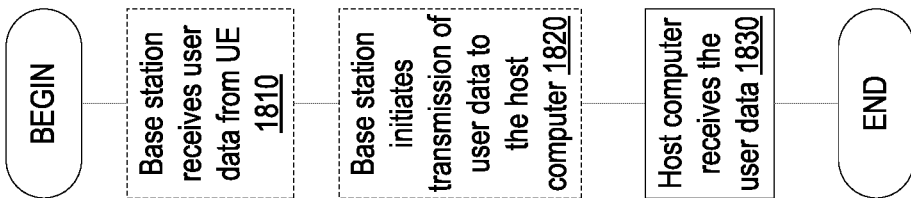
FIG. 18 shows a method implemented in a communication system including a host computer, a base station and a user equipment per some embodiments

FIG. 18 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 18 will be included in this section. In step 1810 (which may be optional), in accordance with the teachings of the embodiments described throughout this disclosure, the base station receives user data from the UE. In step 1820 (which may be optional), the base station initiates transmission of the received user data to the host computer. In step 1830 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

EMBODIMENTS

A set of unliming examples of embodiments are included herein below.

1. A method to be performed by a first network function (NF) to support restricted Proximity-based Services (ProSe) direct discovery in a wireless network, wherein a terminal device communicates with another terminal device based on the restricted ProSe direct discovery, and wherein the wireless network is to assign one ProSe Discovery user equipment (UE) identifier (PDUID) to the terminal device to identify the terminal device in the restricted ProSe direct discovery, the method comprising: receiving (404) a request message including a UE identifier (UE ID), wherein the UE ID uniquely identifies the UE in the wireless network; generating (406) a ProSe Discovery user equipment (UE) identifier (PDUID) for the UE ID based on the UE ID; and transmitting (408, 422) a PDUID information message to a second NF, wherein the PDUID information message comprises the PDUID and a validity timer.

2. The method of embodiment 1, wherein the first NF comprises a policy control function (PCF) and the second NF comprises a Direct Discovery Name Management Function (DDNMF).

3. The method of embodiment 1 or 2, wherein the request message is received from a third NF, wherein the third NF transmits the request message upon receiving (402) a registration request from the terminal device.

4. The method of embodiments 1 to 3, further comprising: transmitting (410) a response message to the third NF in response to the request message, wherein the response message includes the PDUID, and wherein the third NF transmits (412) a non-access stratum (NAS) message including the PDUID to the terminal device.

5. The method of embodiments 1 to 4, wherein the response message comprises a message transfer service message.

6. The method of embodiments 1 to 4, wherein the PDUID is obtained by the terminal device during a registration procedure of the terminal device.

7. The method of embodiments 1 to 4, wherein the third NF comprises an Access and Mobility Management Function (AMF).

8. The method of embodiments 1 to 7, wherein the PDUID information message is transmitted (422) in response to a PDUID request message transmitted from the second NF.

9. The method of embodiments 1 to 8, wherein the second NF receives (416) an announce or monitor request from the terminal device, wherein the announce or monitor request comprises the UE ID and a Restricted ProSe Application User ID (RPAUID), and wherein the second NF authorizes whether the terminal device may perform the restricted ProSe direct discovery.

10. The method of embodiments 1 to 9, wherein the request message (404) comprises a UE policy association establishment message.

11. A method to support restricted Proximity-based Services (ProSe) direct discovery in a wireless network, wherein a terminal device communicates with another terminal device based on the restricted ProSe direct discovery, wherein the wireless network is to assign one ProSe Discovery user equipment (UE) identifier (PDUID) to the terminal device to identify the terminal device in the restricted ProSe direct discovery, wherein a first network function (NF) maintains PDUIDs for the wireless network, and wherein the method is to be performed by a second NF, the method comprising: receiving (416) an announce or monitor request from the terminal device, wherein the announce or monitor request comprises the UE ID and a Restricted ProSe Application User ID (RPAUID); verifying (418) that the terminal device is authorized to perform the restricted ProSe direct discovery; receiving (408, 422) a PDUID information message comprising a PDUID corresponding to the UE ID from the first NF; and transmitting (430) a response to the announce or monitor request from the terminal device, indicating whether the announce or monitor request is accepted.

12. The method of embodiment 11, wherein the first NF comprises a policy control function (PCF) and the second NF comprises a Direct Discovery Name Management Function (DDNMF).

13. The method of embodiment 11 or 12, wherein the PDUID corresponding to the UE ID is received in response to a PDUID request message transmitting from the second NF to the first NF, wherein the PDUID request message comprises the UE ID.

14. The method of embodiments 11 to 13, wherein the PDUID information message further comprises a validity timer that indicates a time period, expiration of which causes the first NF to transmit another PDUID information message.

15. The method of embodiments 11 to 14, further comprising: transmitting (424) an authorization request message to a ProSe application server, wherein the authorization request message comprises the RPAUID; and receiving (426) an authorization response message from the ProSe application server, wherein the authorization response message comprises one PDUID corresponding to the RPAUID according to the ProSe application server; and verifying that the one PDUID received from the ProSe application server matches the PDUID prior to accepting the announce or monitor request.

16. A method to be performed by a network function (NF) to support restricted Proximity-based Services (ProSe) direct discovery in a wireless network, wherein a terminal device communicates with another terminal device based on the restricted ProSe direct discovery, and wherein the wireless network is to assign one ProSe Discovery user equipment (UE) identifier (PDUID) to the terminal device to identify the terminal device in the restricted ProSe direct discovery, the method comprising: receiving (502) a request message including a UE identifier (UE ID), wherein the UE ID uniquely identifies the UE in the wireless network; verifying (504) that the terminal device is authorized to perform the restricted ProSe direct discovery; generating (504) a ProSe Discovery user equipment (UE) identifier (PDUID) for the UE ID based on the UE ID; interacting (506) with a ProSe application server to register the PDUID at the ProSe application server and to obtain a Restricted ProSe Application User ID (RPAUID) corresponding to the PDUID; and transmitting (508), a response message including the UE ID, the PDUID, the RPAUID, and a validity timer.

17. The method of embodiment 16, wherein the NF comprises a Direct Discovery Name Management Function (DDNMF).

18. The method of embodiment 16 or 17, wherein the NF maintains a mapping for the terminal device between the UE ID and a pair comprising the PDUID and RPAUID.

19. The method of embodiments 16 to 18, further comprising: receiving (516) an announce or monitor request from the terminal device, wherein the announce or monitor request comprises the UE ID and the RPAUID; verifying (518) whether the RPAUID received from the terminal device matches the RPAUID in the mapping maintained for the terminal device; when the two RPAUIDs match, transmitting (524) an authorization request message to a ProSe application server, wherein the authorization request message comprises the RPAUID; receiving (526) an authorization response message from the ProSe application server; and transmitting (530) an announce or monitor response to the terminal device based on the authorization response message.

20. The method of embodiments 16 to 19, wherein the authorization response message does not indicate the PDUID.

21. The method of embodiment 16 to 19, further comprising: when the two RPAUIDs fail to match, transmitting an announce or monitor response to the terminal device based on match failure.

22. The method of embodiments 16 to 22, wherein the UE ID is one of a subscription permanent identifier (SUPI) or a subscription concealed identifier (SUCI).

23. A network node (902) to implement a first network function to support restricted Proximity-based Services (ProSe) direct discovery in a wireless network, wherein a terminal device communicates with another terminal device based on the restricted ProSe direct discovery, and wherein the wireless network is to assign one ProSe Discovery user equipment (UE) identifier (PDUID) to the terminal device to identify the terminal device in the restricted ProSe direct discovery, the network node comprising: a processor (942) and non-transitory machine-readable storage medium (949) that provides instructions that, when executed by the processor, cause the network node to perform methods of embodiments 1 to 10.

24. A network node (902) to support restricted Proximity-based Services (ProSe) direct discovery in a wireless network, wherein a terminal device communicates with another terminal device based on the restricted ProSe direct discovery, wherein the wireless network is to assign one ProSe Discovery user equipment (UE) identifier (PDUID) to the terminal device to identify the terminal device in the restricted ProSe direct discovery, wherein a first network function (NF) maintains PDU-IDs for the wireless network, and wherein the network node to implement a second NF, the network node comprising: a processor (942) and non-transitory machine-readable storage medium (949) that provides instructions that, when executed by the processor, cause the network node to perform methods of embodiments 11 to 15.

25. A network node (902) to implement a network function to support restricted Proximity-based Services (ProSe) direct discovery in a wireless network, wherein a terminal device communicates with another terminal device based on the restricted ProSe direct discovery, and wherein the wireless network is to assign one ProSe Discovery user equipment (UE) identifier (PDUID) to the terminal device to identify the terminal device in the restricted ProSe direct discovery, the network node comprising: a processor (942) and non-transitory machine-readable storage medium (949) that provides instructions that, when executed by the processor, cause the network node to perform methods of embodiments 16 to 22.

26. A non-transitory machine-readable storage medium (949) that provides instructions that, when executed by a processor, cause a network node to perform methods of embodiments 1 to 10.

27. A non-transitory machine-readable storage medium (949) that provides instructions that, when executed by a processor, cause a network node to perform methods of embodiments 11 to 15.

28. A non-transitory machine-readable storage medium (949) that provides instructions that, when executed by a processor, cause a network node to perform methods of embodiments 16 to 22.

What is claimed is:

1. A method performed by a first network function (NF) to support restricted Proximity-based Services (ProSe) direct discovery in a wireless network, wherein a terminal device communicates with another terminal device based on the restricted ProSe direct discovery, and wherein the wireless network is to assign one ProSe Discovery user equipment (UE) identifier (PDUID) to the terminal device to identify the terminal device in the restricted ProSe direct discovery, the method comprising:

receiving a request message including a UE identifier (UE ID), wherein the UE ID uniquely identifies the UE in the wireless network;

generating a ProSe Discovery user equipment (UE) identifier (PDUID) for the UE ID based on the UE ID; and transmitting a PDUID information message to a second NF, wherein the PDUID information message comprises the PDUID and a validity timer, and wherein the PDUID information message is transmitted in response to a PDUID request message transmitted from the second NF.

2. The method of claim 1, wherein the first NF comprises a policy control function (PCF) and the second NF comprises a Direct Discovery Name Management Function (DDNMF).

3. The method of claim 1, wherein the request message is received from a third NF, wherein the third NF transmits the request message upon receiving a registration request from the terminal device.

4. The method of claim 3, further comprising:

transmitting a response message to the third NF in response to the request message, wherein the response message includes the PDUID, and wherein the third NF transmits a non-access stratum (NAS) message including the PDUID to the terminal device.

5. The method of claim 4, wherein the response message comprises a message transfer service message.

6. The method of claim 3, wherein the PDUID is obtained by the terminal device during a registration procedure of the terminal device.

7. The method of claim 3, wherein the third NF comprises an Access and Mobility Management Function (AMF).

8. The method of claim 1, wherein the second NF receives an announce or monitor request from the terminal device, wherein the announce or monitor request comprises the UE ID and a Restricted ProSe Application User ID (RPAUID), and wherein the second NF authorizes whether the terminal device may perform the restricted ProSe direct discovery.

9. The method of claim 1, wherein the request message comprises a UE policy association establishment message.

10. A method to support restricted Proximity-based Services (ProSe) direct discovery in a wireless network, wherein a terminal device communicates with another terminal device based on the restricted ProSe direct discovery, wherein the wireless network is to assign one ProSe Discovery user equipment (UE) identifier (PDUID) to the terminal device to identify the terminal device in the restricted ProSe direct discovery, wherein a first network function (NF) maintains PDUIDs for the wireless network, and wherein the method is performed by a second NF, the method comprising:

receiving an announce or monitor request from the terminal device, wherein the announce or monitor request comprises a UE ID and a Restricted ProSe Application User ID (RPAUID);

verifying that the terminal device is authorized to perform the restricted ProSe direct discovery;

sending a PDUID request message to the first NF;

receiving a PDUID information message comprising a PDUID corresponding to the UE ID from the first NF, wherein the PDUID information message is transmitted in response to a PDUID request message transmitted from the second NF; and transmitting a response to the announce or monitor request from the terminal device, indicating whether the announce or monitor request is accepted.

11. The method of claim 10, wherein the first NF comprises a policy control function (PCF) and the second NF comprises a Direct Discovery Name Management Function (DDNMF).

12. The method of claim 10, wherein the PDUID information message further comprises a validity timer that indicates a time period, expiration of which causes the first NF to transmit another PDUID information message.

13. The method of claim 10, further comprising:

transmitting an authorization request message to a ProSe application server, wherein the authorization request message comprises the RPAUID;

receiving an authorization response message from the ProSe application server, wherein the authorization response message comprises one PDUID corresponding to the RPAUID according to the ProSe application server; and verifying that the one PDUID received from the ProSe application server matches the PDUID prior to accepting the announce or monitor request.

14. A network node to implement a first network function to support restricted Proximity-based Services (ProSe) direct discovery in a wireless network, wherein a terminal device communicates with another terminal device based on the restricted ProSe direct discovery, and wherein the wireless network is to assign one ProSe Discovery user equipment (UE) identifier (PDUID) to the terminal device to identify the terminal device in the restricted ProSe direct discovery, the network node comprising:

a processor and non-transitory machine-readable storage medium providing instructions that, when executed by the processor, cause the network node to perform:

receiving a request message including a UE identifier (UE ID), wherein the UE ID uniquely identifies the UE in the wireless network;

generating a ProSe Discovery user equipment (UE) identifier (PDUID) for the UE ID based on the UE ID; and transmitting a PDUID information message to a second NF, wherein the PDUID information message comprises the PDUID and a validity timer, wherein the PDUID information message is transmitted in response to a PDUID request message transmitted from the second NF.

15. The network node of claim 14, wherein the first NF comprises a policy control function (PCF) and the second NF comprises a Direct Discovery Name Management Function (DDNMF).

16. The network node of claim 14, wherein the request message is received from a third NF, wherein the third NF transmits the request message upon receiving a registration request from the terminal device.

17. The network node of claim 16, further comprising:

transmitting a response message to the third NF in response to the request message, wherein the response message includes the PDUID, and wherein the third NF transmits a non-access stratum (NAS) message including the PDUID to the terminal device.

18. A network node to support restricted Proximity-based Services (ProSe) direct discovery in a wireless network, wherein a terminal device communicates with another terminal device based on the restricted ProSe direct discovery, wherein the wireless network is to assign one ProSe Discovery user equipment (UE) identifier (PDUID) to the terminal device to identify the terminal device in the restricted ProSe direct discovery, wherein a first network function (NF) maintains PDUIDs for the wireless network, and wherein the network node to implement a second NF, the network node comprising:

a processor and non-transitory machine-readable storage medium (949) providing instructions that, when executed by the processor, cause the network node to perform:

receiving an announce or monitor request from the terminal device, wherein the announce or monitor request comprises a UE ID and a Restricted ProSe Application User ID (RPAUID);

verifying that the terminal device is authorized to perform the restricted ProSe direct discovery;

sending a PDUID request message to a second NF;

receiving a PDUID information message comprising a PDUID corresponding to the UE ID from the first NF, wherein the PDUID information message is transmitted in response to a PDUID request message transmitted from the second NF; and transmitting a response to the announce or monitor request from the terminal device, indicating whether the announce or monitor request is accepted.

\* \* \* \* \*